US010140019B2

(12) United States Patent
Sakamoto et al.

(10) Patent No.: US 10,140,019 B2
(45) Date of Patent: Nov. 27, 2018

(54) INFORMATION PROCESSING APPARATUS AND INFORMATION PROCESSING METHOD FOR DISPLAY OF PLURALITY OF IMAGES BASED ON USER OPERATION

(71) Applicant: SONY CORPORATION, Tokyo (JP)

(72) Inventors: Noriaki Sakamoto, Tokyo (JP); Kentaro Ida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 83 days.

(21) Appl. No.: 14/654,809

(22) PCT Filed: Dec. 16, 2013

(86) PCT No.: PCT/JP2013/083600
§ 371 (c)(1),
(2) Date: Jun. 22, 2015

(87) PCT Pub. No.: WO2014/103776
PCT Pub. Date: Jul. 3, 2014

(65) Prior Publication Data
US 2015/0324086 A1 Nov. 12, 2015

(30) Foreign Application Priority Data
Dec. 28, 2012 (JP) ................................ 2012-286725

(51) Int. Cl.
G06F 3/0489 (2013.01)
G06F 3/0488 (2013.01)
(Continued)

(52) U.S. Cl.
CPC .......... *G06F 3/0489* (2013.01); *G06F 3/0482* (2013.01); *G06F 3/0488* (2013.01);
(Continued)

(58) Field of Classification Search
CPC .. G06F 3/0489; G06F 3/0482; G06F 3/04842; G06F 3/0488; G06F 3/04886; G06F 3/14
See application file for complete search history.

(56) References Cited

U.S. PATENT DOCUMENTS

| 2006/0015818 A1* | 1/2006 | Chaudhri .............. G06F 3/0481 715/779 |
| 2007/0101297 A1* | 5/2007 | Forstall ............... G06F 3/04817 715/841 |

(Continued)

FOREIGN PATENT DOCUMENTS

| JP | 2001-086269 A | 3/2001 |
| JP | 2001086269 | * 3/2001 |

(Continued)

Primary Examiner — Lisa Landis
(74) Attorney, Agent, or Firm — Chip Law Group

(57) ABSTRACT

There is provided an information processing apparatus including an acquisition unit configured to acquire an input signal generated in response to user's input operation for specifying a predetermined position in an image displayed on a display unit, and a display control unit configured to allow display of a selection image for allowing a user to select display information that is newly displayed in a region according to the position, in a superimposed manner on the image. The display control unit controls display of the display unit in such a manner that the region and the selection image do not overlap each other.

12 Claims, 18 Drawing Sheets

(51) Int. Cl.
*G06F 3/14* (2006.01)
*G06F 3/0484* (2013.01)
*G06F 3/0482* (2013.01)

(52) U.S. Cl.
CPC ...... *G06F 3/04842* (2013.01); *G06F 3/04886* (2013.01); *G06F 3/14* (2013.01)

(56) References Cited

U.S. PATENT DOCUMENTS

2011/0066636 A1* 3/2011 Guido .................. G06F 17/241
707/769
2013/0125052 A1* 5/2013 Baird .................... G06F 3/0482
715/810

FOREIGN PATENT DOCUMENTS

| JP | 2001086296 | * | 3/2001 |
| JP | 2006-238171 A | | 9/2006 |
| JP | 2007-047324 A | | 2/2007 |
| JP | 2007047324 | * | 2/2007 |
| JP | 2008-299443 A | | 12/2008 |
| JP | 2008299443 | * | 12/2008 |
| JP | 2010-231589 A | | 10/2010 |
| JP | 2010231589 | * | 10/2010 |

* cited by examiner

INFORMATION PROCESSING APPARATUS AND INFORMATION PROCESSING METHOD FOR DISPLAY OF PLURALITY OF IMAGES BASED ON USER OPERATION

TECHNICAL FIELD

The present technology relates to an information processing apparatus, an information processing method, and a recording medium. In particular, the present technology relates to an information processing apparatus, an information processing method, and a recording medium, which enable more simple character input.

BACKGROUND ART

In the case of a character input method of a numeric keypad type employed in mobile phone terminals of the past, twenty six alphabetic characters and other several symbols are divided into respective groups of numeric characters, and one key is assigned to each group, for example.

In this character input method of the numeric keypad type, a user presses a key assigned to a group including the character that the user wants to input, as the first procedure. Next, as the second procedure, the key is repeatedly pushed to switch the characters in the group assigned to the key in turn according to the number of times the key is pressed, in order to make the characters selectable. Then, as the third procedure, the user stops pressing the key, when the character that is switched and made selectable becomes an intended character. Thereby, an intended alphabetic character or an intended symbol is input.

In the case of this character input method, the key is to be pressed a plurality of times to select a character that the user wants to input, and thus the user performs cumbersome work such as repeating the key press operation. Hence, for example, Patent Literature 1 proposes a character input method in which one character is input by one key operating action.

In the character input method described in Patent Literature 1, twenty six alphabetic characters and other several symbols are divided into respective groups of numeric characters, and one key is assigned to each group, for example, in the same way as the character input method of the numeric keypad type of the past. Then, in the character input procedure in this character input method, the user presses a key assigned to a group including the character that the user wants to input, as the first procedure.

Next, as the second procedure, when the key keeps being pushed, the characters in the group assigned to the key are switched in turn at constant time intervals to make the characters selectable according to the key press continuing duration, and then the user stops pressing the key and gets the finger off from the key when an intended character appears. Thereby, an intended alphabetic character or an intended symbol is input.

In recent years, mobile phone terminals having a touch panel are becoming prevalent. Terminals including a touch panel are becoming prevalent not just in mobile phone terminals, but also in personal computers and the like. In some terminals including a touch panel, a virtual keyboard depicting a keyboard is displayed on a display to perform character input when inputting characters.

Also, in personal computers not including a touch panel also have a character inputting function using a virtual keyboard.

CITATION LIST

Patent Literature

Patent Literature 1: JP 2006-238171A

SUMMARY OF INVENTION

Technical Problem

When the virtual keyboard is displayed for inputting characters, the window including the field into which a user wants to input characters is displayed in such a manner that the window of virtual keyboard is superimposed thereon. In such a display, the virtual keyboard is sometimes superimposed and displayed on the field into which the user wants to input characters.

In this case, if the user wants to confirm the field into which the user wants to input characters or the text displayed on the vicinity of the field, the user switches the display to set, at the top, the window displaying the field into which the user wants to input characters, to make it the active window. Thereafter, the window of the virtual keyboard is set as the active window, to input characters.

As described above, when a user wants to confirm a part into which the user wants to input characters, but the part is unable to be confirmed, the user operates to set the hidden window in an active state, resulting in decrease of work efficiency and usability. It is desirable that a user can input characters while confirming the area into which the user wants to input characters.

The present technology is made in view of the above situation, and displays an auxiliary display for character input without hiding the part into which the user wants to input characters.

Solution to Problem

According to one aspect of the present technology, there is provided an information processing apparatus including an acquisition unit configured to acquire an input signal generated in response to user's input operation for specifying a predetermined position in an image displayed on a display unit, and a display control unit configured to allow display of a selection image for allowing a user to select display information that is newly displayed in a region according to the position, in a superimposed manner on the image. The display control unit controls display of the display unit in such a manner that the region and the selection image do not overlap each other.

The display control unit can control the display in such a manner that the selection image is displayed at an opposite position to a position of the region in one of upward, downward, leftward, and rightward directions.

The display control unit can divide the selection image into a plurality of sections, and locates the plurality of sections of the divided selection image in regions other than the region, respectively.

The display control unit can change a display position of the selection image, when it is determined that the selection image and the region overlap each other.

The display information displayed in the selection image can be one of first information that accumulates, as a history, information for which a copy instruction is given, and second information selected from the accumulated information.

The selection image can include a tab that is operated for displaying the first information and a tab that is operated for displaying the second information, and includes display information corresponding to the tab selected.

The selection image can include both of the first information and the second information.

The display information can be displayed in a state of being classified into each category.

The display information displayed in the selection image can be sorted on the basis of information that is to be pasted in the region.

The selection image can be displayed above an image including the region, regardless of whether or not the image including the region is in an active state.

An input operation accepting unit configured to accept input operation from the user, and the display unit can be further included. The input operation accepting unit can include a touch panel.

The selection image can be displayed, when the region is pressed for a long period.

According to one aspect of the present technology, there is provided an information processing method including steps of acquiring an input signal generated in response to user's input operation for specifying a predetermined position in an image displayed on a display unit, displaying a selection image for allowing a user to select display information that is newly displayed in a region according to the position, in a superimposed manner on the image, and controlling display of the display unit in such a manner that the region and the selection image do not overlap each other.

According to one aspect of the present technology, there is provided a recording medium having a program recorded thereon, the program causing a computer to execute a process including steps of acquiring an input signal generated in response to user's input operation for specifying a predetermined position in an image displayed on a display unit, displaying a selection image for allowing a user to select display information that is newly displayed in a region according to the position, in a superimposed manner on the image, and controlling display of the display unit in such a manner that the region and the selection image do not overlap each other.

In the information processing apparatus, the information processing method, and the recording medium in one aspect of the present technology, an input signal generated in response to user's input operation for specifying a predetermined position in an image displayed on a display unit is acquired, and a selection image for allowing the user to select display information newly displayed in a region according to the position is displayed and superimposed on the image, and display of the display unit is controlled such that the region and the selection image do not overlap each other.

Advantageous Effects of Invention

According to one aspect of the present technology, an auxiliary display for character input is displayed without hiding the part into which a user wants to input characters.

DESCRIPTION OF EMBODIMENTS

In the following, an embodiment for carrying out the present technology (hereinafter, referred to as embodiment) will be described. Note that the description will be made in the following order.
1. Configuration of Terminal
2. History and Favorite
3. Method of Registration
4. Example of Consecutive Copy
5. Move of Clipboard Window
6. Display Position of Clipboard Window
7. Recording Medium <Configuration of Terminal>

Figure 1:
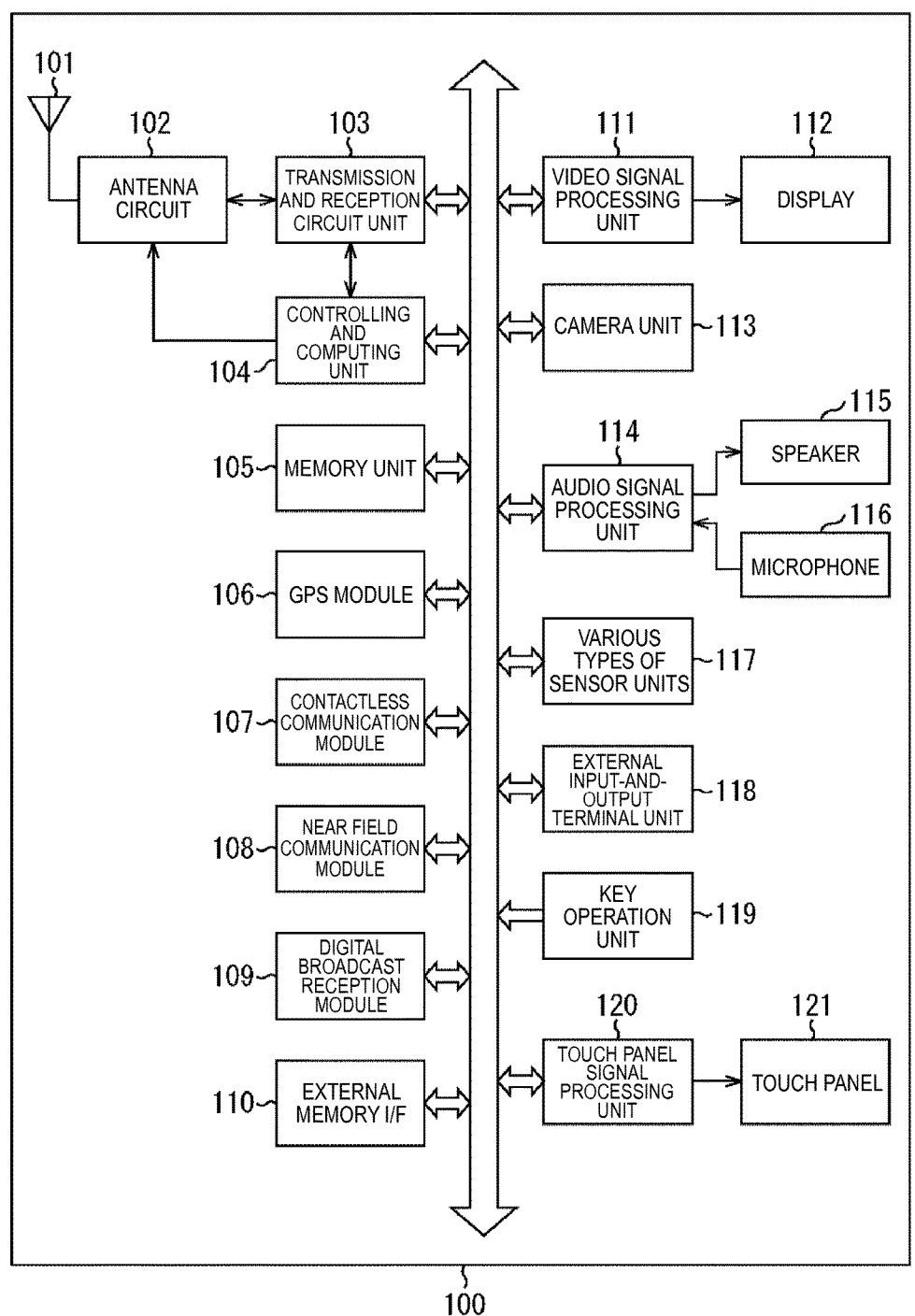
FIG. 1 is a diagram illustrating a configuration of an embodiment of a terminal to which the present technology is applied.

FIG. 1 is a block diagram of a terminal 100. The terminal 100 may be a terminal that is often installed and used at a predetermined site, such as a desktop personal computer and a television receiver. Also, the terminal 100 may be a mobile phone, such as a mobile phone called smartphone. In the following, the description will be made, assuming that the terminal 100 is a mobile phone called smartphone, or a tablet personal computer.

In the present technology described below, information for assisting in inputting characters (hereinafter, the assist information) is displayed. Also, the assist information is displayed so as not to hide a part into which characters are input. The present technology can be applied to a terminal having a function for displaying the assist information and a function for displaying a screen image into which characters are to be input.

Input characters include characters such as alphabet and hiragana (Japanese syllabary characters) as well as symbols and marks.

In the terminal 100 illustrated in FIG. 1, a communication antenna 101 is a built-in antenna for example, and performs telephone calls through a mobile telephone network and a public wireless communication network and transmission and reception of e-mails, download of various types of application programs, and transmission and reception of signal radio waves for communicating with the Internet or the like. An antenna circuit 102 includes an antenna switching unit, a matching circuit, a filter circuit, and others. A transmission and reception circuit unit 103 performs frequency conversion, modulation, and demodulation of signals transmitted and received through a mobile telephone network and a public wireless communication network.

A controlling and computing unit 104 includes a central processing unit (CPU), and controls each of the transmission and reception circuit unit 103, a video signal processing unit 111, an audio signal processing unit 114, a GPS module 106, a contactless communication module 107, a near field communication module 108, a digital broadcast reception module 109, an external memory interface 110, a camera unit 113, various types of sensor units 117, an external input-and-output terminal unit 118, a key operation unit 119, and a touch panel signal processing unit 120, in order to execute various types of computation as necessary.

Also, the controlling and computing unit 104 executes control programs and various types of application programs stored in a memory unit 105. In addition, the terminal 100 includes each component provided in a general information terminal, such as a clock unit for measuring time duration and time point, a battery for supplying electric power to each unit, and a power management IC for controlling electric power.

The memory unit 105 includes a built-in memory provided in the inside of this terminal and an attachable and detachable card memory. The attachable and detachable card memory is, for example, a card for storing information, such as what is called SIM (Subscriber Identity Module). The built-in memory includes a ROM (Read Only Memory) and a RAM (Random Access Memory).

The ROM stores an operating system (OS), a control program for controlling each unit by the controlling and computing unit 104, various types of initial set values, dictionary data, predictive character conversion dictionary data, various types of sound data, various types of application programs, for example. The ROM includes a rewritable ROM, such as a NAND-type flash memory or an electrically erasable programmable read-only memory (EEPROM), and is capable of saving e-mail data, data of telephone book and e-mail address book, data of still images and moving image content, and other various types of user set values, for example. The RAM stores data as a work area and a buffer space when the controlling and computing unit 104 performs various types of data processing in a timely manner.

A GPS (Global Positioning System) module 106 includes a GPS antenna, and calculates the latitude and the longitude of a current position of the terminal itself using GPS signals from the GPS geodetic satellites. GPS data obtained by the GPS module 106 (information indicating latitude and longitude) is sent to the controlling and computing unit 104. Thereby, the controlling and computing unit 104 obtains information of the current position and move of the terminal itself.

The contactless communication module 107 performs contactless communication which is used in what is called RFID (Radio Frequency-Identification), contactless IC card, and the like, for example, through a contactless communication antenna.

The near field communication module 108 includes a communication antenna for near field radio wave, such as wireless LAN and Bluetooth (registered trademark), and a near field communication circuit. Various types of application programs may be acquired via the near field communication module 108.

The digital broadcast reception module 109 includes an antenna and a tuner for receiving what is called digital television broadcast and digital radio broadcast, for example. The digital broadcast reception module 109 is configured to receive not only one channel of digital broadcast, but simultaneously a plurality of channels of digital broadcast. Also, the digital broadcast reception module 109 receives data incorporated in digital broadcast. Note that the digital broadcast data received by the digital broadcast reception module 109 may be stored (i.e., recorded) in the memory unit 105 or the like, after compressed by the controlling and computing unit 104, for example. Also, various types of application programs may be broadcasted as one of the display broadcast data.

Also, the external memory interface 110 includes an external memory slot for attaching and detaching a memory medium such as an external memory, and an interface circuit for communication of external memory data. Various types of application programs may be acquired via a memory medium, such as an external memory inserted and attached into the external memory interface 110.

The video signal processing unit 111 includes a decompression and decode circuit that decompresses and decodes compressed and encoded video data supplied from the controlling and computing unit 104, and a display panel drive circuit that displays on the display 112 the decompressed and decoded digital video and digital broadcast videos received at the digital broadcast reception module 109, for example. Also, the video signal processing unit 111 generates video signals for displaying a desktop image, various types of menu images, a virtual touch area image corresponding to a position on a touch panel, and the like supplied from the controlling and computing unit 104, and displays these images on the display 112.

The camera unit 113 includes an imaging sensor, an optical system, and its peripheral circuits for capturing still images and moving images, and a light drive circuit for projecting assist light for image capturing, for example. Still image data and moving image data captured by the camera unit 113 are sent to the video signal processing unit 111 as preview video data. Thereby, while the camera is capturing images, a preview video is displayed on the display 112. Also, when still image data and moving image data captured by the camera unit 113 are recorded, the captured still image data and moving image data are sent to the controlling and computing unit 104 and compressed, and thereafter is stored in the memory unit 105 or an external memory connected to the external memory interface 110.

The speaker 115 is used in music replay, receiving sound output, ring tone output, for example. The microphone 116 is used for collecting outside sound and transmitting sound, for example. The audio signal processing unit 114 includes an amplifier circuit for the speaker 115, an amplifier circuit for the microphone 116, a decompression and decode circuit that decompresses and decodes compressed and encoded sound data supplied from the controlling and computing unit 104, a digital-to-analog conversion circuit that converts decompressed and decoded digital sound data to an analog audio signal, an analog-to-digital conversion circuit that converts an analog audio signal input from the microphone 116 to digital sound data, and a compression and encode circuit that compresses and encodes digital sound data, for example.

The various types of sensor units 117 includes various types of detection sensors and its peripheral circuits, such as a terminal state detection sensor for detecting a state of a portable information terminal 1 of the present embodiment. The various types of sensor units 117 includes a tilt sensor, an acceleration sensor, a direction sensor, a temperature sensor, a humidity sensor, and an illuminance sensor, for example. Detection signals by the various types of sensor units 117 are sent to the controlling and computing unit 104. Thereby, the controlling and computing unit 104 receives information of the state of the terminal 100 (tilt, acceleration, direction, temperature, degree of humidity, intensity of illumination, etc).

The external input-and-output terminal unit 118 includes a cable connecting connector and an outside-data communication interface circuit for performing data communication through a cable, and a charge terminal and its charge interface circuit for charging an internal battery through a power supply cable or the like, for example. Various types of application programs may be acquired via the external input-and-output terminal unit 118.

The key operation unit 119 includes a hardware key provided on a housing and its peripheral circuits. The key operation unit 119 converts a press operation input of a hardware key by a user to an electrical signal, and amplifies the operation input signal and converts the operation input signal from analog to digital, and sends the operation input data after the analog-to-digital conversion to the controlling and computing unit 104.

The touch panel 121 is an input operation unit having a detection surface for detecting an operation input by a user, and is made of a transparent touch sensor screen sensor provided on the entire surface of the display 112. The touch panel signal processing unit 120 measures a touch detection position and a touch trail from the touch panel 121, a touch continuing duration, and a touch time interval, for example, and sends the measured data as touch detection data to the controlling and computing unit 104. Note that the touch panel 121 and the touch panel signal processing unit 120 are compatible with what is called multi-touch.

Figure 2:
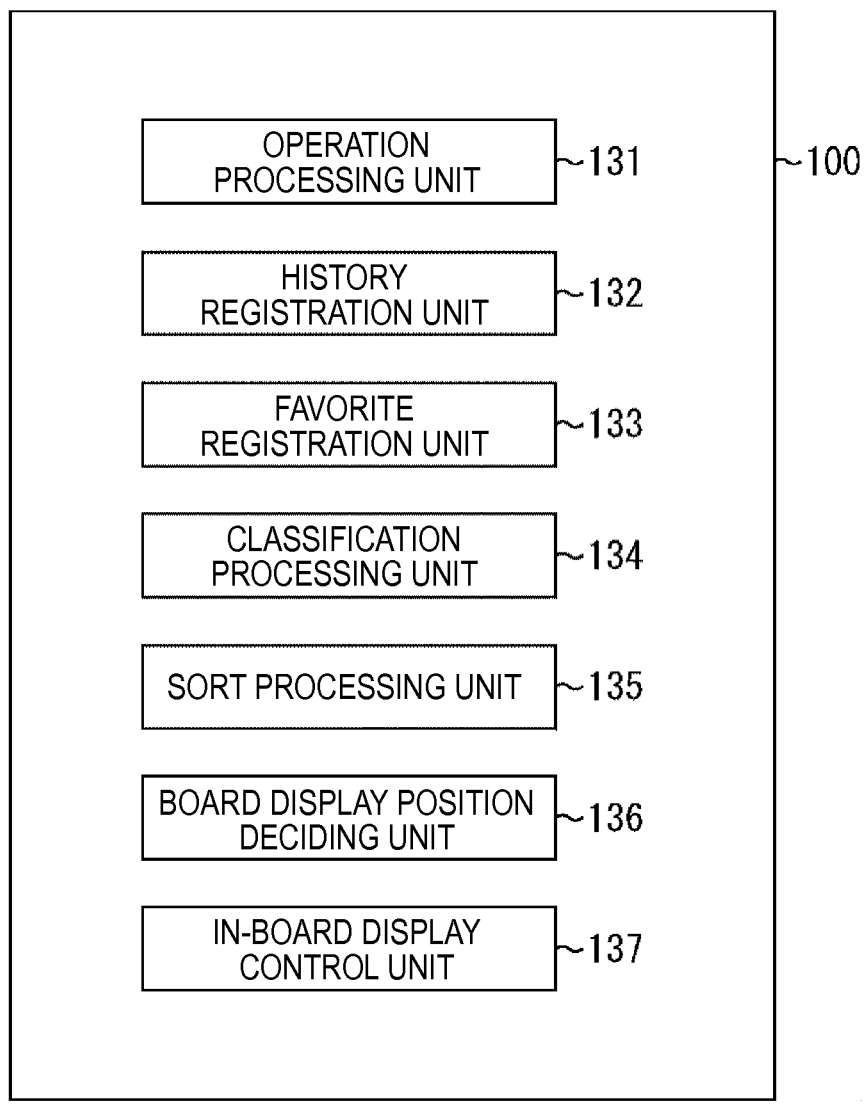
FIG. 2 is a diagram illustrating a function of a terminal.

FIG. 2 is a functional block diagram of the terminal 100. The terminal 100 includes an operation processing unit 131, a history registration unit 132, a favorite registration unit 133, a classification processing unit 134, a sort processing unit 135, a board display position deciding unit 136, and an in-board display control unit 137. The functions illustrated in FIG. 2 are relevant to processing such as copying and pasting of information described below, and the terminal 100 includes other functions that are not depicted.

The operation processing unit 131 executes a process according to operation when operating an operation unit such as the key operation unit 119 and the touch panel 121, for example. For example, when the operation processing unit 131 is instructed to select information from a clipboard window 150, which is described later with reference to FIG. 7, or to paste the selected information, the operation processing unit 131 accepts the operation and sends instructions to each unit in the terminal 100 as necessary in order to execute a corresponding process.

Figure 3:
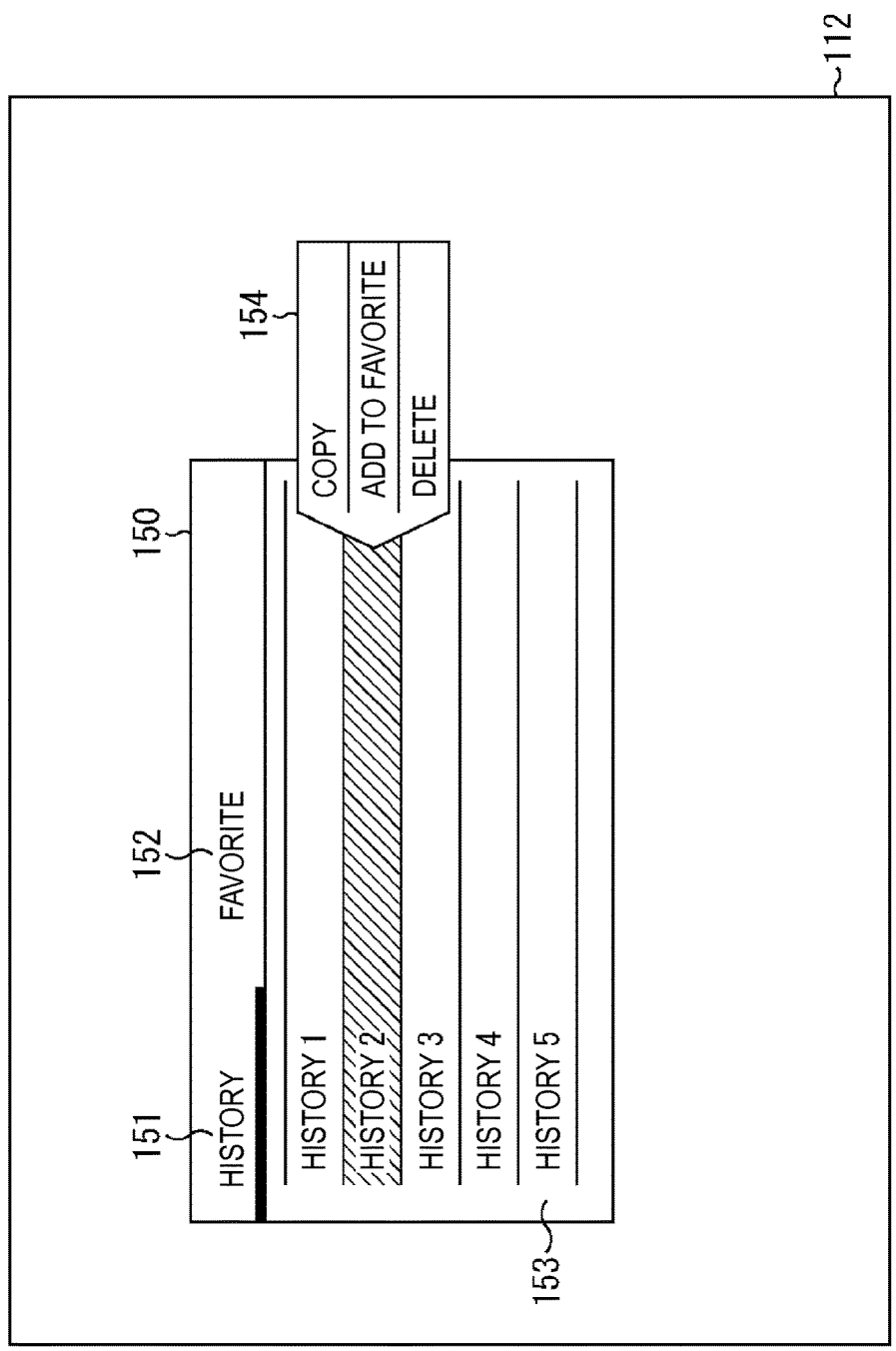
FIG. 3 is an exemplary screen image displayed on a terminal.
Figure 6:
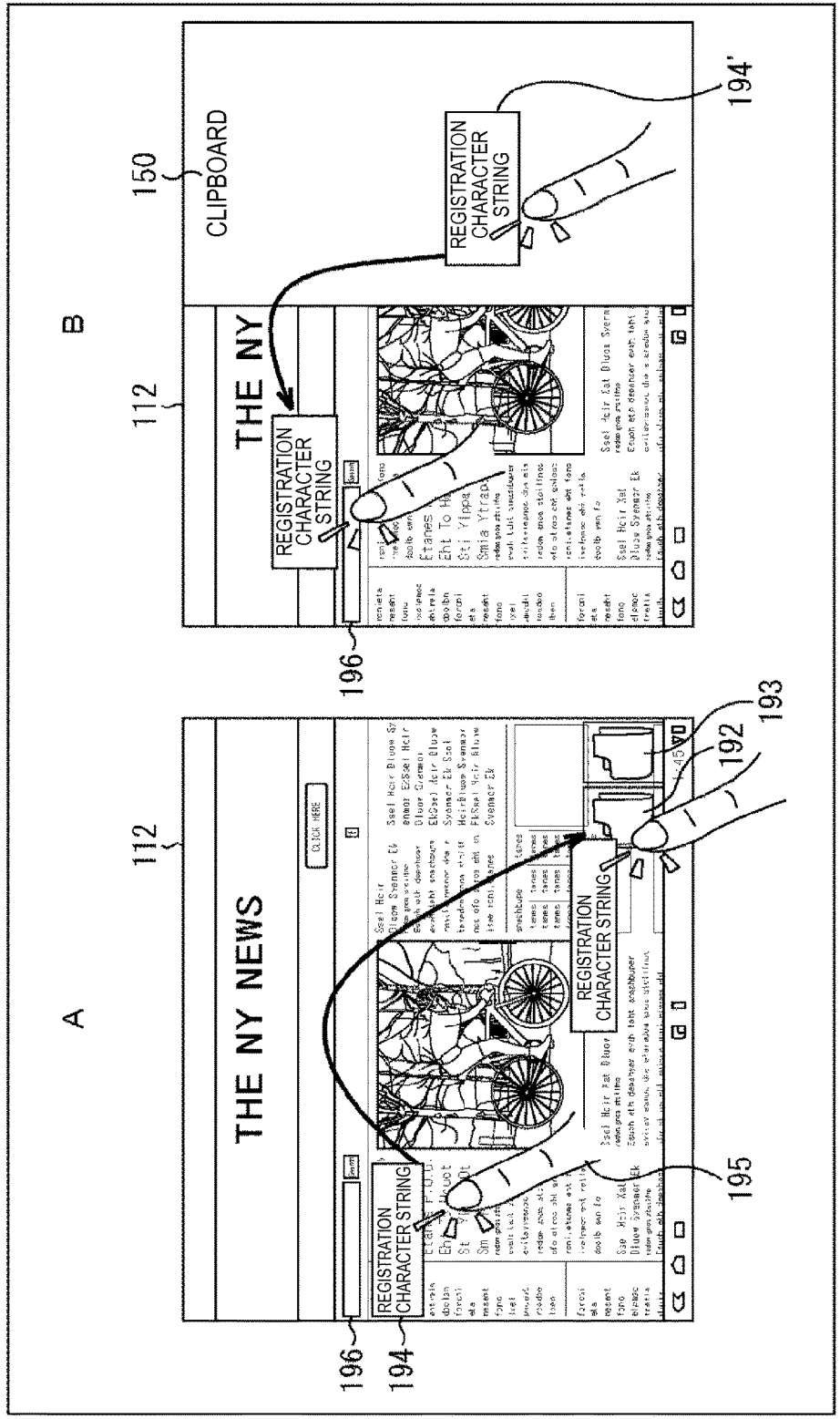
FIG. 6 is a diagram for describing pasting of information.

When a "history" tab 151 of the clipboard window 150, which is described later with reference to FIG. 3, is selected, the history registration unit 132 executes a process for registering the information displayed in the clipboard window 150. The history registration unit 132 executes a process relevant to the registration, which is described later with reference to FIG. 6.

Figure 4:
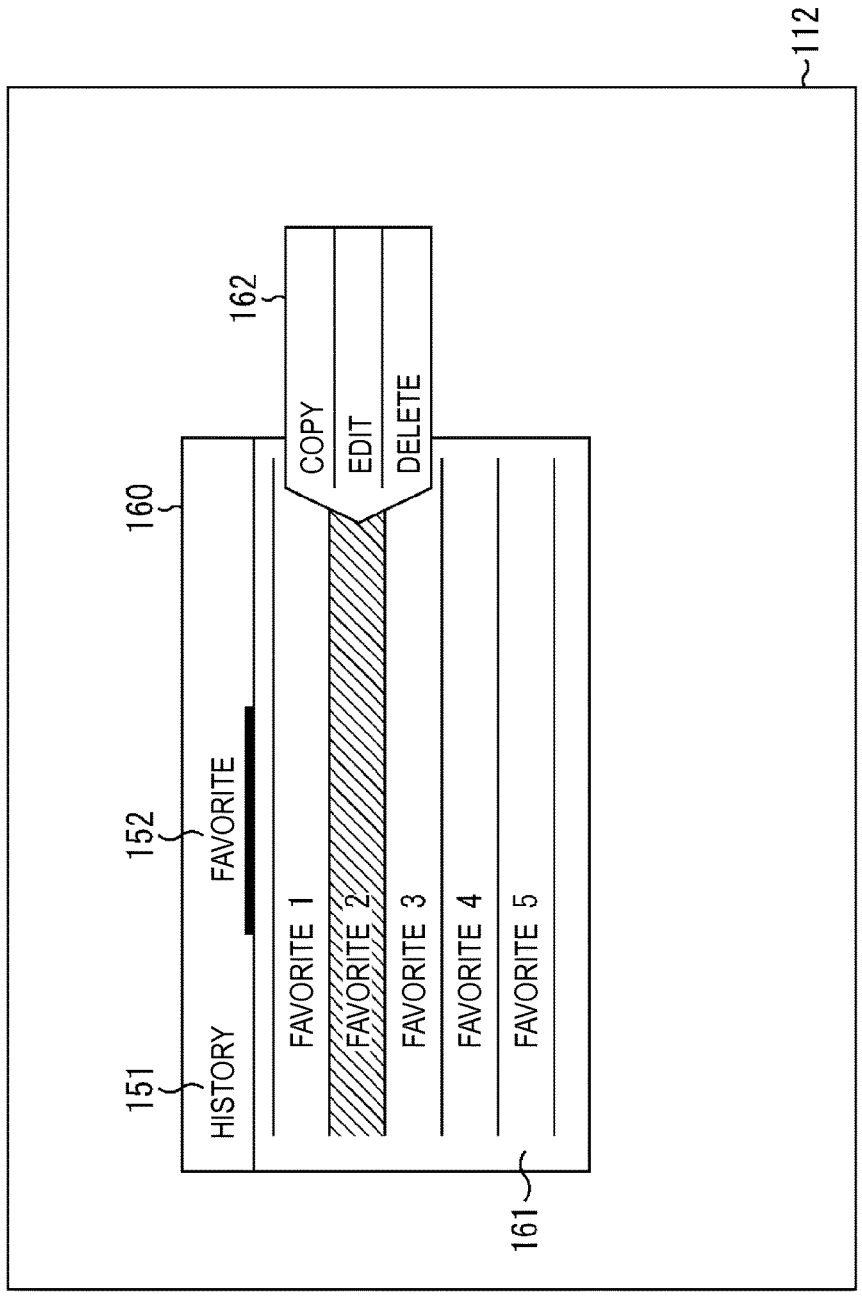
FIG. 4 is an exemplary screen image displayed on a terminal.

When a "favorite" tab 152 of the clipboard window 150, which is described later with reference to FIG. 4, is selected, the favorite registration unit 133 executes a process for registering the information displayed in the clipboard window 150. The favorite registration unit 133 executes a process relevant to the registration, which is described later with reference to FIG. 3, FIG. 4, and FIG. 6.

The classification processing unit 134 executes a process relevant to classification of the information displayed in the clipboard window 150, which is described with reference to FIG. 8 and FIG. 9. For example, when new information is registered by the history registration unit 132 and the favorite registration unit 133, the classification processing unit 134 analyzes the registered information, and classifies the information by determining which category the registered information belongs to among set categories, using the analysis result.

The sort processing unit 135 executes a process for sorting information in a predetermined order described with reference to FIG. 8 and displaying it. The sort processing unit 135 executes a process for sorting the registered information in a predetermined order, such as in the order of category, in the order of registration date and time, and in the order of Japanese vowels (a, i, u, e, and o).

The board display position deciding unit 136 decides the display position of the clipboard window 150 in the screen image. As described with reference to FIG. 6 and subsequent drawings, the clipboard window 150 is displayed at a position that avoids the information paste destination selected from the clipboard window 150. In this way, the board display position deciding unit 136 controls display in such a manner that the information paste destination and the clipboard window 150 do not overlap each other.

The in-board display control unit 137 controls the display of the registered information. For example, the in-board display control unit 137 controls the display of a history list display section 153 when the "history" tab 151 described with reference to FIG. 3 and FIG. 4 is selected, and the display of a favorite list display section 161 when the "favorite" tab 152 is selected, as well as controls the switch of display in the clipboard window 150 when tab switch operation is performed.

These functions work together to execute the process relevant to the display described below.

<History and Favorite>

In the following, information for assisting character input displayed when inputting characters will be described. The information for assisting character input displayed when inputting characters includes "history" and "favorite". "History" is information such as character, character string, symbol, and mark, for which a copy instruction is given. In the following, character, character string, symbol, and mark, are collectively referred to as "character". "Favorite" is information of characters which are selected by a user from "history" for a registration instruction, or characters which are input by a user to be registered in "favorite".

FIG. 3 is an exemplary screen image displayed on the display 112 (FIG. 1) when a display instruction is given for "history". The display 112 displays the clipboard window 150. The clipboard window 150 is provided with two tabs. One is the "history" tab 151, and the other is the "favorite" tab 152.

Note that the exemplary display of the clipboard window 150 illustrated in FIG. 3 is just one example. As described later, "history" and "favorite" may be displayed as a list without the tabs for switching them, and the display size, the display position and the like may be changed according to location in the display 112.

The clipboard window 150 is displayed when a predetermined operation is performed by a user. For example, the clipboard window 150 is displayed, when the target field of character input is tapped for a long period, or when the item "clipboard window" displayed in a screen image is selected, for example. The display size and position are the size and the position that do not hamper character input, the detail of which is described later.

The clipboard window 150 illustrated in FIG. 3 is in a state in which the "history" tab 151 is selected, and the history list is displayed on the history list display section 153. As the history list, "history 1", "history 2", "history 3", "history 4", and "history 5" are displayed in the history list display section 153. "History 1" to "history 5" are the characters for which the user has given a copy instruction. For example, "history 1" to "history 5" are character string of name and address, URI (Uniform Resource Identifier), emotion icon, mark, and like.

Usually, copying and pasting of the copied character correspond to each other one to one. For example, when characters "copy 1" are copied and pasted, and thereafter characters "copy 2" are copied and pasted, and again characters "copy 1" are copied and pasted, characters "copy 1" are to be copied repeatedly. In this case, the information of the copied characters "copy 1" is overwritten and deleted by the information of characters "copy 2" that are copied subsequently.

Thus, "copy 1" is able to be pasted consecutively, but is unable to be pasted again after "copy 2". As described above, copying and pasting of the copied characters correspond to each other one to one.

However, according to the present technology, the copied characters are retained as a history. That is, for example, in FIG. 3, "history 1" displayed on the clipboard window 150 is characters "copy 1", and "history 2" is characters "copy 2".

For example, if a user wants to copy and paste the characters "copy 1" and thereafter copy and paste the characters "copy 2" and again paste the characters "copy 1", the user displays the clipboard window 150, and selects the characters "copy 1" displayed in the displayed clipboard window 150, and again copies the characters "copy 1", and pastes it.

Referring to FIG. 3, a menu 154 is displayed at an area where characters "history 2" is displayed. The menu 154 is displayed by a predetermined operation, such as tapping the area where characters "history 2" is displayed and right-clicking a mouse. In the menu 154, an item "copy", an item "add to favorite", and an item "deletion" are displayed.

As described above, the item "copy" of the menu 154 is an item that is operated when pasting again. For example, when the item "copy" is selected in the state illustrated in FIG. 3, the information "history 2" is copied to make it the target information for pasting.

The item "add to favorite" of the menu 154 is an item that is operated when adding to the favorite. The item "add to favorite" is an item that is operated when adding to, and registering in, a favorite list displayed when the "favorite" tab 152 described later with reference to FIG. 4 is selected.

The item "deletion" of the menu 154 is an item operated when deleting the history displayed on the history list display section 153 (information registered as the history). For example, as illustrated in FIG. 3, if the item "deletion" is selected from the menu 154 when the information "history 2" is selected, the information "history 2" is deleted from the history list display section 153.

FIG. 4 is an example of a screen image displayed when the "favorite" tab 152 is selected. In the clipboard window 150 illustrated in FIG. 4, the "favorite" tab 152 is selected, and a list of information registered as favorite is displayed on the favorite list display section 161. In the favorite list display section 161, "favorite 1", "favorite 2", "favorite 3", "favorite 4", and "favorite 5" are displayed as the favorite list.

"Favorite 1" to "favorite 5" are information for which a user has given a copy instruction and is copied from the history list display section 153. For example, "favorite 1" to "favorite 5" are character string of name and address, URI (Uniform Resource Identifier), emotion icon, mark, and like.

Referring to FIG. 4, the menu 162 is displayed at the part where the information "favorite 2" is displayed. The menu 162 is displayed by a predetermined operation, such as tapping the part where "favorite 2" is displayed, and right-clicking a mouse. In the menu 162, an item "copy", an item "edit", and an item "deletion" are displayed.

The item "copy" of the menu 162 is an item operated when pasting. For example, when the item "copy" is selected in the state illustrated in FIG. 4, the information "favorite 2" is copied to make it the target information for pasting.

The item "edit" of the menu 162 is an item operated when editing information registered in favorite.

The item "deletion" of the menu 162 is an item operated when deleting the favorite displayed on the favorite list display section 161 (information registered as favorite). For example, as illustrated in FIG. 3, if the item "deletion" is selected from the menu 162 when the information "favorite 2" is selected, the information "favorite 2" is deleted from the favorite list display section 161.

Figure 5:
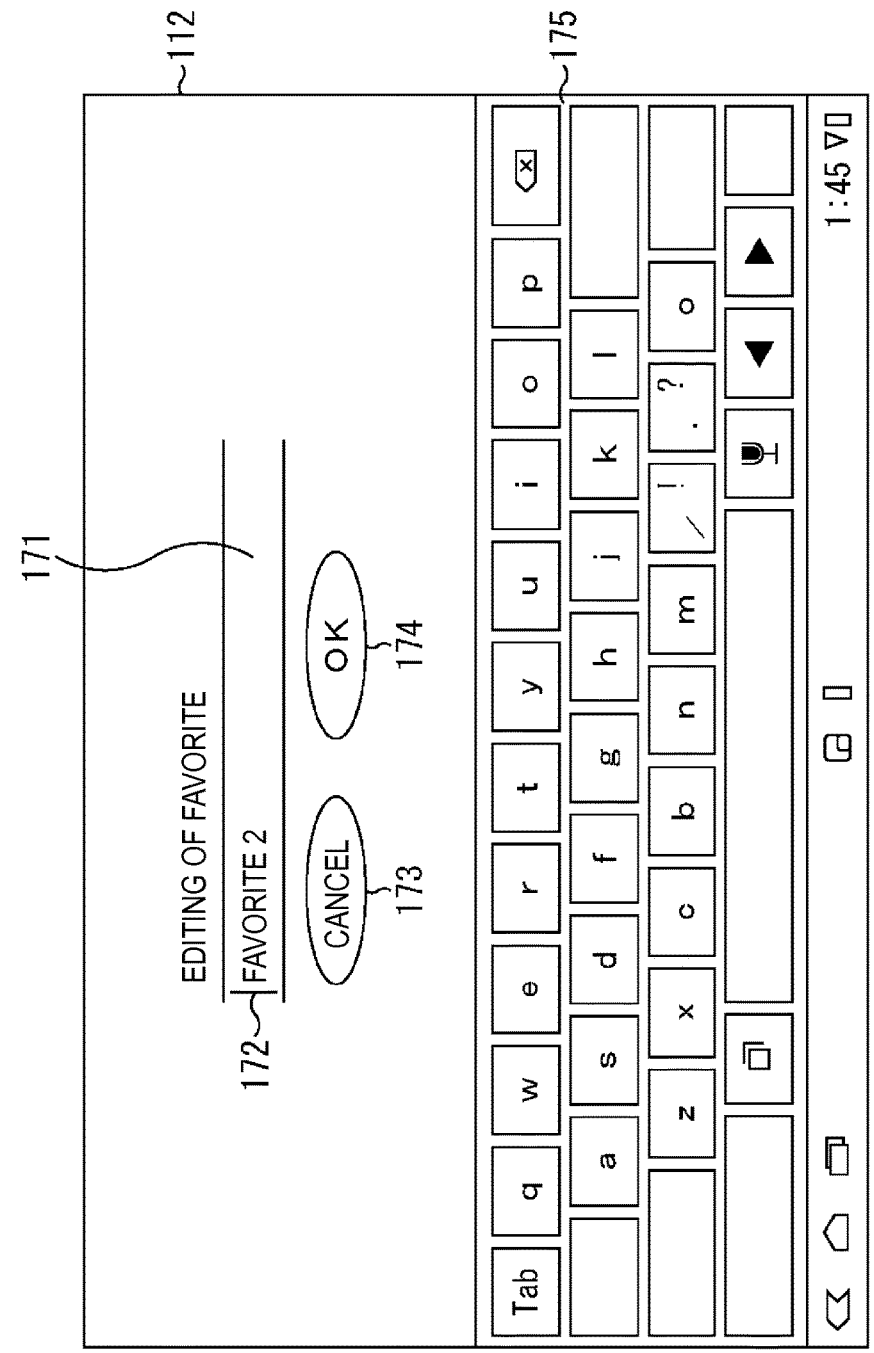
FIG. 5 is an exemplary screen image displayed on a terminal.

FIG. 5 is an exemplary screen image displayed when the item "edit" is selected from the menu 162 in the screen image illustrated in FIG. 4. In the upper section of the screen image illustrated in FIG. 5, an edit target display field 171 is displayed below the display "edit favorite" to display edit target information. In this case, the information "favorite 2" is the edit target, and thus the information "favorite 2" is displayed, in the edit target display field 171.

In the edit target display field 171, a cursor 172 for making the edit target recognized is also displayed. Below the edit target display field 171, a "cancel" button 173 and the "OK" button 174 are displayed. The "cancel" button 173 is a button operated for not reflecting edit result, and the "OK" button 174 is the button operated for reflecting edit result.

Below these buttons (screen images), a virtual keyboard 175 is displayed. A user operates the displayed virtual keyboard 175 to edit information displayed on the edit target display field 171. The edit information is displayed on the favorite list display section 161 (FIG. 4).

The favorite list display section 161 displays not just information selected from the history list display section 153, but also information registered by a user inputting characters. The screen image displayed when a user inputs characters is basically the screen image illustrated in FIG. 5. That is, when a user operates the virtual keyboard 175 displayed, to input information that the user wants to register as favorite.

As described above, the clipboard window 150 includes history and favorite. A user switches between history and favorite in order to input, in this case copy, intended information. Also, the tabs are switched by a predetermined operation, such as touching the tab 151 and the tab 152 and flicking.

Note that the registration number for registering in the history and the registration number for registering in the favorite are each limited. When the number of information registered in the history exceeds the limitation value, the temporally old history is deleted, and a new history is registered additionally, for example. In the same way, when the number of information registered in the favorite exceeds the limitation value, the temporally old favorite is deleted, and a new favorite is registered additionally. Alternatively, a message for informing a user that the number has exceeded the limitation value so as not to allow new registration may be displayed, in order to prompt the user to delete unnecessary favorite information.

Also, when information registered in the history is registered in the favorite, the information may be deleted from the history.

<Method of Registration>

As above, information for which a copy instruction is given is registered as the history. Information registered as the history, and information input by a user, are registered as the favorite. A method of registration in history and favorite in a simple and convenient manner will be described additionally.

FIG. 6A is a diagram for describing a registration procedure, and is an exemplary screen image displayed on the display 112 of the terminal 100. The display 112 displays a page downloaded from a server connected via a network. The page may be a text created by a word processor or the like.

Also, an icon 192 operated when registering in the history and an icon 193 operated when registering in the favorite are displayed at a predetermined position of the display 112, at a lower right position in an example illustrated in FIG. 6A. Here, the characters displayed on the upper left of the screen image is the character string that a user wants to register as history, and is referred to as registration character string 194.

The user drags the registration character string 194 with a user's finger 195, and drops it on the icon 192 that is operated when registering in history. Such drag-and-drop operation is performed to register the registration character string 194 as a piece of information of the history. When registering in the favorite, the registration character string 194 is dropped on the icon 193.

Here, although drag and drop is taken as an example of a predetermined operation for registration, the predetermined operation is not limited to the drag and drop, but may be operation such as long tap and flick. In the following description, drag and drop is described as a predetermined operation, but the predetermined operation may be long tap and flick in the same way.

The registration character string 194 registered in this way is displayed on the history list display section 153 or the favorite list display section 161 of the clipboard window 150, as a piece of information of history or favorite. For example, as illustrated in FIG. 6B, the clipboard window 150 is displayed on the right side of the screen image, and the registration character string 194' is displayed in the clipboard window 150. A prime is added to the registration character string after the registration to distinguish it from the registration character string 194 before registration.

In a character input field 196 displayed on the left side of the screen image illustrated in FIG. 6B is a field for inputting search characters. When a user wants to paste the registered registration character string 194' in the character input field 196, the user long taps the character input field 196, for example. By long tapping the character input field 196, the clipboard window 150 is displayed.

The clipboard window 150 is displayed in such a manner that its size and position do not hide the character input field 196. Although, in an example, the clipboard window 150 illustrated in FIG. 6B is displayed at the right side of the screen image with the size of approximately half screen image, the clipboard window 150 may be displayed with different sizes at different positions, depending on the position of the character input field 196. This will be described sequentially in the following.

The user drags the registration character string 194' displayed in the displayed clipboard window 150 and drops it on the character input field 196, in order to paste the registration character string 194' in the character input field 196. As described above, the registration and pasting are executed by simple and convenient operation, so as to improve usability.

<Example of Consecutive Copy>

Figure 7:
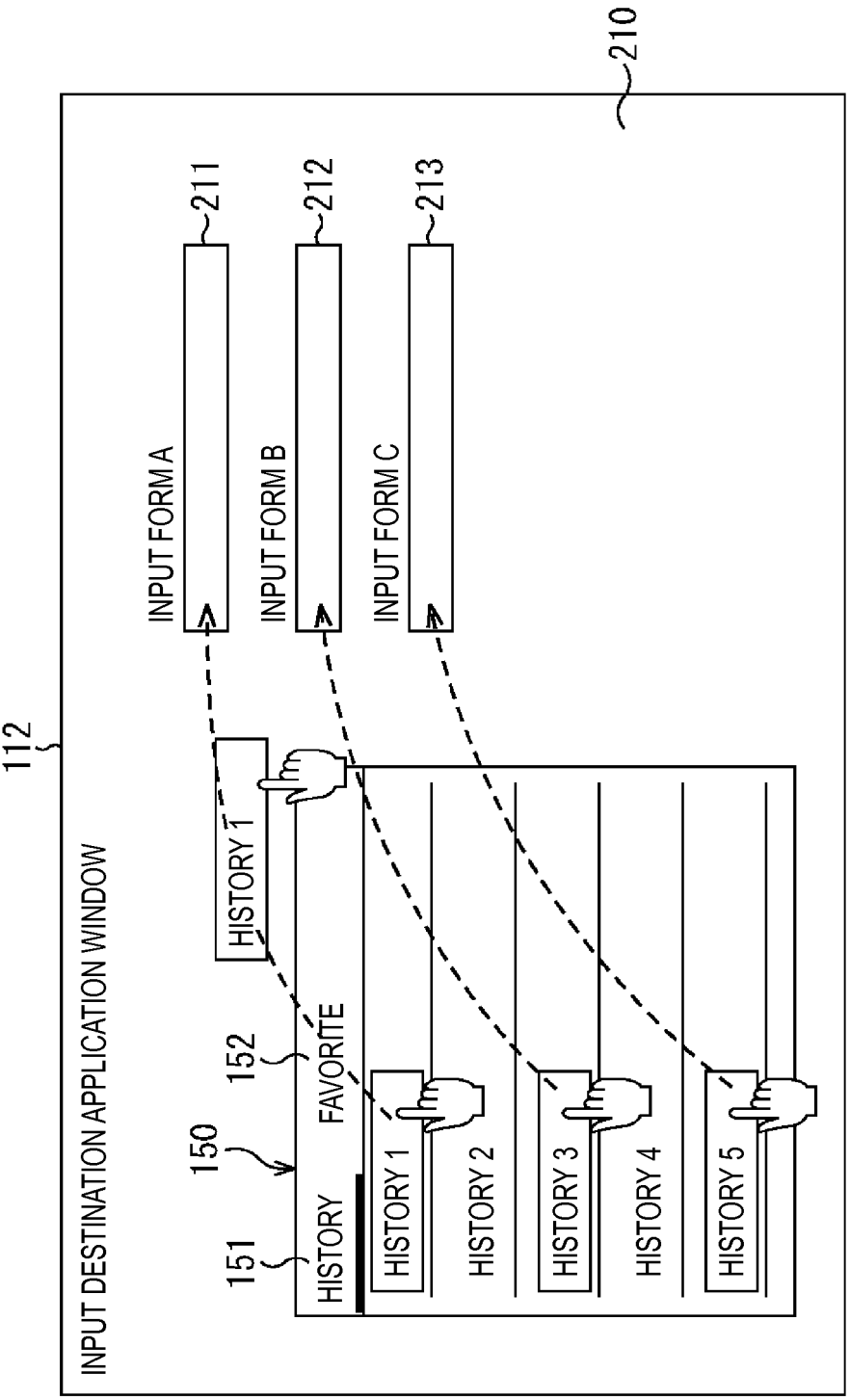
FIG. 7 is a diagram for describing pasting of information.

In addition, copy (paste) will be described. FIG. 7 is a diagram for describing operation when pasting history consecutively. In the exemplary screen image illustrated in FIG. 7, a field 211, a field 212, and a field 213 corresponding to input forms A to C are displayed at the right side of the screen image. These fields 211 to 213 are fields in the screen image displayed by processing of an input destination application. For example, it is a screen image displayed by the processing of an application that is referred to as address book for registering name, address, etc.

In the following, a screen image displayed by the processing of the input destination application is referred to as input destination application window. In the screen image illustrated in FIG. 7, the screen image is the input destination application window 210.

For example, when a user long taps the field 211, the clipboard window 150 is displayed at a position avoiding the field 211. That is, in this case, as illustrated in FIG. 7, since the field 211 is displayed at the right side of the screen image, the clipboard window 150 is displayed at the left side of the screen image. Since the history tab 151 is selected, the clipboard window 150 displays the history list display section 153.

When a user wants to paste the information "history 1" in the field 211 of the input form A, the user can paste it in the field 211, by dragging the information "history 1" from the history list display section 153 and dropping it on the field 211.

Subsequently, when a user wants to paste the information "history 3" in the field 212 of the input form B, the user can paste it in the field 212, by dragging the information "history 3" from the history list display section 153 and dropping it on the field 212.

When the user drops "history 1" on the field 211, the input destination application window 210 turns into an active state, and the clipboard window 150 turns into an inactive state. The inactive window is displayed behind the active window, so that the user is unable to see the inactive window in some cases.

However, in the present embodiment, even if the clipboard window 150 turns into an inactive state, the clipboard window 150 is displayed on the active input destination application window 210. In other words, regardless of whether or not the clipboard window 150 is active, the state of the screen image illustrated in FIG. 7 continues.

Thereby, when a user wants to paste the information "history 3" in the field 212 of the input form B and thereafter paste the information "history 5" in the field 213 of the input form C, the information "history 5" is pasted in the field 213, by continuously dragging the information "history 5" from the history list display section 153 and dropping it on the field 213, since the clipboard window 150 is displayed on the input destination application window 210.

If the clipboard window 150 turned into an inactive state and were displayed behind the input destination application window 210 (displayed in a state in which a user is unable to operate) when a user wants to paste the information "history 3" in the field 212 of the input form B, a user would perform the operation for turning the clipboard window 150 into an active state and displaying it on the input destination application window 210, in order to further paste the information "history 5" on the field 213 of the input form C.

Then, the clipboard window 150 is turned into an active state, and thereafter, drag-and-drop operation is performed to paste the information "history 5" in the field 213. As described above, if the clipboard window 150 were displayed behind the input destination application window 210 in an inactive state, a user would perform the operation for turning the clipboard window 150 into an active state every time when the user wants to paste consecutively.

However, according to the present embodiment, since the clipboard window 150 is controlled in such a manner to be kept displayed on the input destination application window 210 even in an inactive state, the clipboard window 150 is needless to be turned into an active state when pasting repeatedly, reducing the number of processes in the operation so as to improve usability.

Such pasting will be described by taking a specific example. FIG. 8 illustrates an exemplary screen image in which an application relevant to address book for managing name, address, etc is activated, and name and other information are input in the address book.

Figure 8:
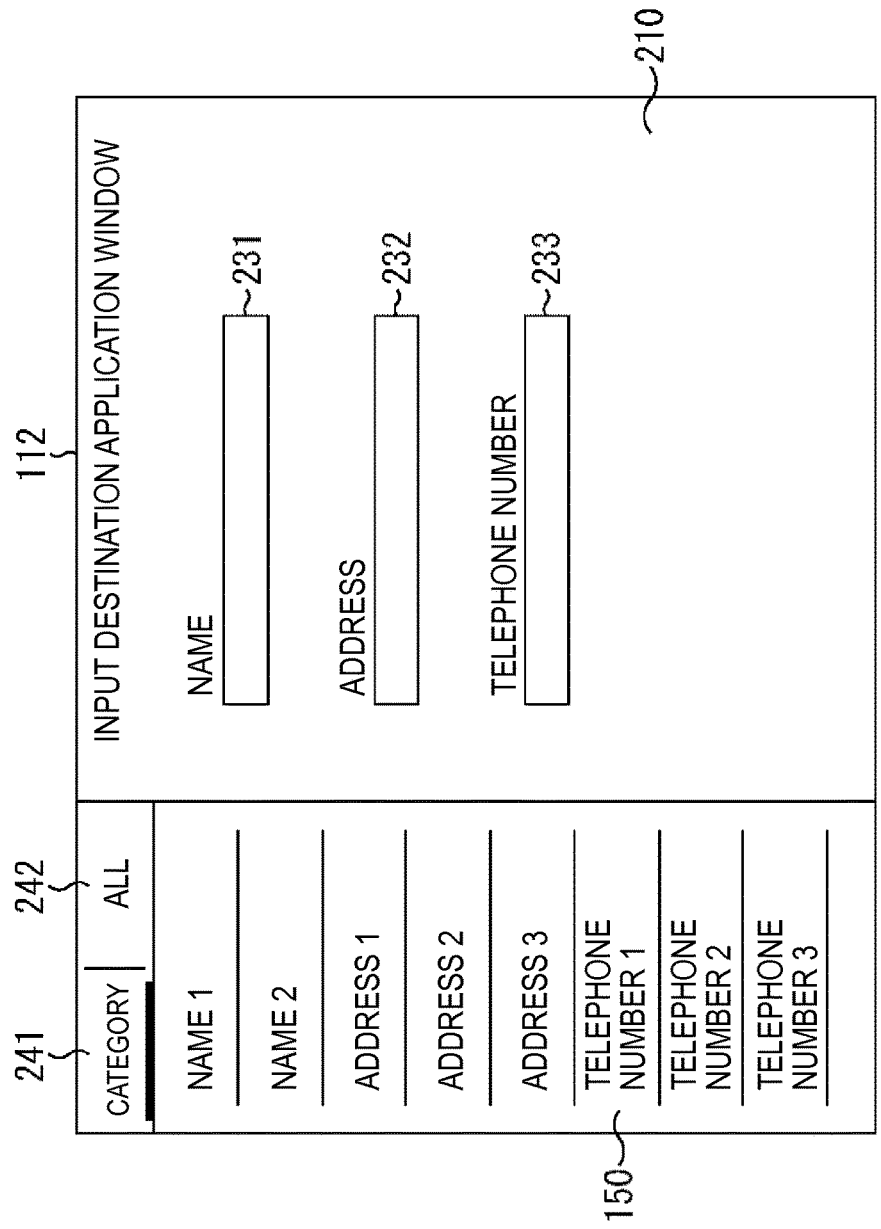
FIG. 8 is a diagram for describing display of a clipboard window.

In the screen image illustrated in FIG. 8, the clipboard window 150 is displayed in the left side, and the input destination application window 210 displayed by processing of the application relevant to the address book is displayed in the remaining part.

In the input destination application window 210, a name input field 231, an address input field 232, and a telephone number input field 233 are displayed. The clipboard window 150 is displayed at a position avoiding these fields 231 to 233.

In the clipboard window 150, information, such as name and address, which is to be registered in the address book is registered at the time point before opening the input destination application window 210 of the address book. For example, a user registers in the clipboard window 150 the information, such as name, address, and telephone number, which is obtained from an received e-mail and is to be registered in the address book, by performing operation described with reference to FIG. 6 for example.

In the clipboard window 150 illustrated in FIG. 8, information such as "name 1", "name 2", "address 1", "address 2", "address 3 ", "telephone number 1", "telephone number 2", and "telephone number 3" are registered. These information may be registered as history, or may be registered as favorite. Here, description will continue, assuming that the information is registered as history.

In an example illustrated in FIG. 8, the information registered as the history is classified into each category, and the information classified into each category is displayed. In the upper section of the clipboard window 150 illustrated in FIG. 8, a "category" tab 241 and an "all" tab 242 are provided.

When the "category" tab 241 is selected, the registered information is displayed in the state of being classified into each category. When the "all" tab 242 is selected, the information is displayed in the order of new registration, for example.

In an example illustrated in FIG. 8, the registered information is displayed in the state of being classified into each category, and is also controlled in such a manner that information that is likely to be input according to input target is displayed closer to top. The input target is the name field 231 and the address field 232, for example.

For example, when the input target is the name field 231, the information classified in name is displayed on the upper section in the clipboard window 150. In FIG. 8, the information "name 1", and the information "name 2" are displayed near top.

Although not depicted, when the input target is the address field 232, the information such as "address 1", "address 2", and "address 3" is displayed closer to top than the information such as "name 1" and "name 2". Such switch of the display is performed each time the input target is switched.

As described with reference to FIG. 7, the present technology enables consecutive pasting. For example, in the screen image illustrated in FIG. 8, when a user wants to paste the information "name 1" in the name field 231, the user drags the information "name 1" from the clipboard window 150 and drops it on the field 231. By such simple and convenient operation, the information "name 1" is first pasted in the name field 231.

Next, a user wants to paste the information "address 1" in the address field 232. Since "name 1" is already pasted in the name field 231, it is determined that the name field 231 is not the input target. Thus, it is determined that one of the field 232 and the field 233 which are below the field 231 is the next input target. Since information is usually pasted sequentially, it is determined that the field 232 that is immediately below the field 231 is the next input target.

By such determination, the input target is set. The information in the clipboard window 150 is sorted in response to the set input target. In this case, since the address field 232 is set as the input target, information is sorted to position the information classified by a keyword "address" near top.

Such sorting enables a user to easily find the information that the user wants to paste, improving usability.

The user drags the information "address 1" from the clipboard window 150, and drops it on the field 232. By such simple and convenient operation, the information "address 1" is pasted in the address field 232.

Further, a user wants to paste the information "telephone number 1" in the telephone number field 233. In this case as well, information is sorted to position the information relevant to telephone number near top, as a result of updating and setting of the input target in the clipboard window 150.

From the clipboard window 150 in which information is sorted, the user drags the information "telephone number 1" and drops it on the field 233, in order to paste the information "telephone number 1" in the telephone number field 233.

As described with reference to FIG. 7, during such consecutive pasting, the clipboard window 150 is kept displayed on the input destination application window 210, so that dragging information from the clipboard window 150 and dropping it on the field is performed consecutively.

In FIG. 8, an example has been described, in which information is classified into each category and sorted according to input target. Also, in FIG. 8, an example has been illustrated and described, in which the information classified into each category is displayed as a list. The information classified into each category may be collected for each category as illustrated in FIG. 9, in order to display only the information corresponding to the selected category.

Figure 9:
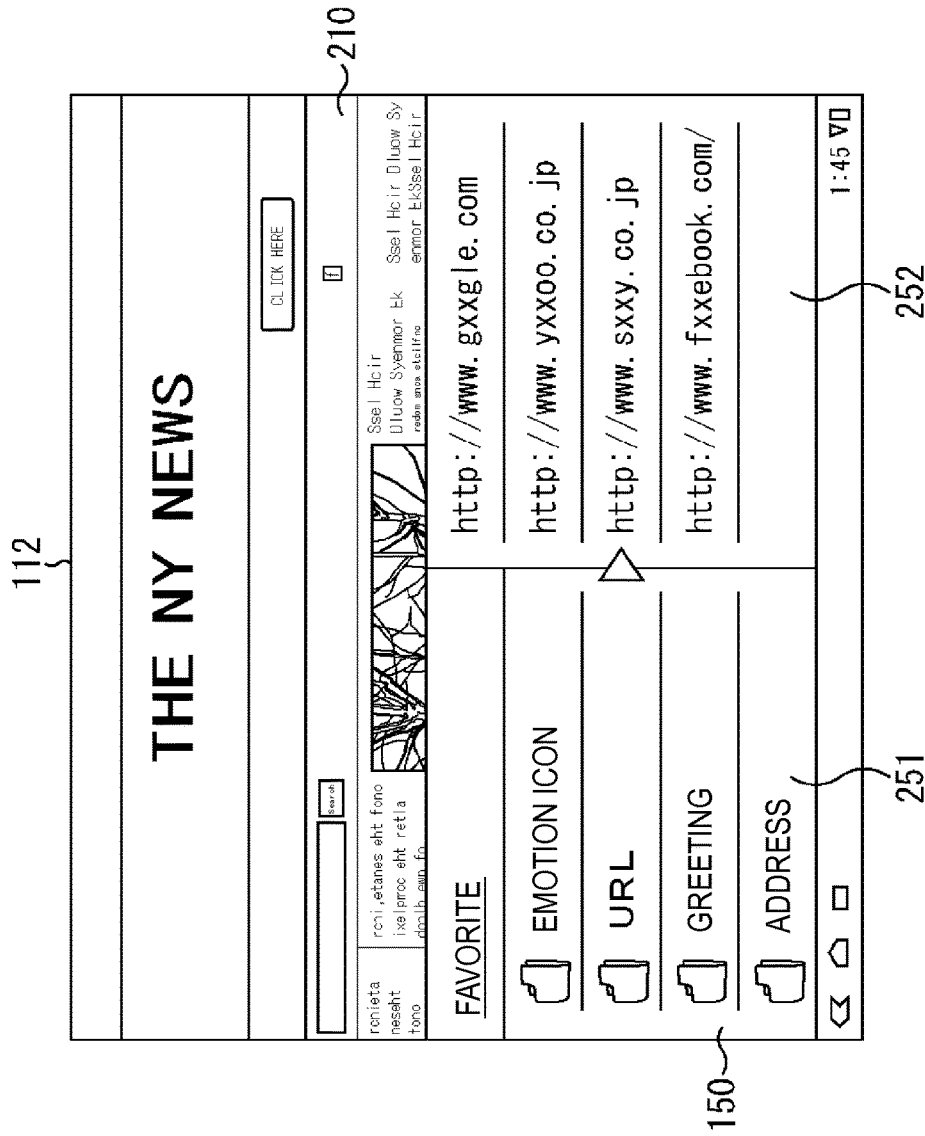
FIG. 9 is a diagram for describing display of a clipboard window.

In the clipboard window 150 illustrated in FIG. 9, the information registered in the favorite is displayed. The clipboard window 150 illustrated in FIG. 9 includes two windows. In the drawing, the left-side window 251 is the window for displaying the categories of classification. In the drawing, the right-side window 252 is the window for displaying the information classified in the selected category.

In the left-side window 251 of the clipboard window 150 illustrated in FIG. 9, category names such as "emotion icon", "URL (Uniform Resource Locator)", "greeting", and "address" are displayed. In the drawing, the category "URL" is selected from the categories displayed in the left-side window 251, and thus URLs classified in "URL" are displayed in the right-side window 252.

When a user gives an instruction of registering into the favorite, the information for which a registration instruction is given is analyzed to be classified and registered in a predetermined category on the basis of the analysis result. For example, when the information for which a registration instruction is given includes the character string "http", the information is classified and registered in the category "URL". Also, the information may be classified, depending on registration time duration, metadata such as types of greeting, address, etc, and situation of copy source and copy destination.

As described above, the categories are displayed in one window, and the information belonging to the selected category is displayed in the other window, so that a user can search for intended information easily, which improves usability.

<Move of Clipboard Window>

In the meantime, for example, when consecutive pasting is performed as described with reference to FIG. 7, the input target fields 211 to 213 are desirably present only at the part where the clipboard window 150 is not displayed as illustrated in FIG. 8, but the clipboard window 150 can be present at the part where the clipboard window 150 is displayed (displayed behind the clipboard window 150).

The procedure in which, when the input target is present at the part where the clipboard window 150 is displayed, the display position of the clipboard window 150 is changed by the operation of the user, will be described with reference to FIG. 10.

Figure 10:
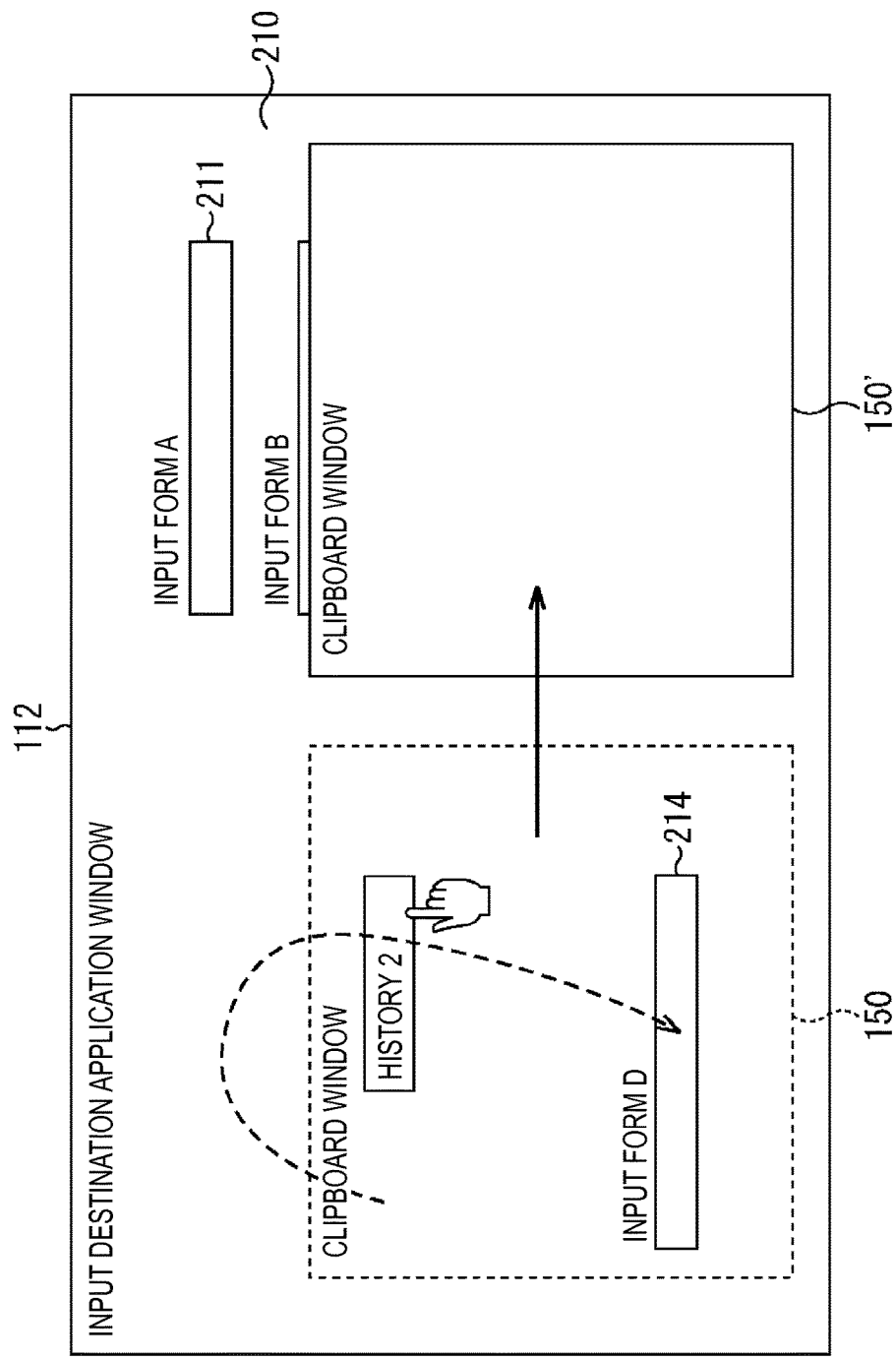
FIG. 10 is a diagram for describing move of a clipboard window.

The state is as illustrated in FIG. 7, and the clipboard window 150 is displayed at the position indicated by the dotted line in FIG. 10. As described with reference to FIG. 7, the user pastes intended information by performing the operation including selecting intended information from the clipboard window 150 and dragging it and dropping it on the fields 211 to 213 of the input forms A to C.

Since the clipboard window 150 is displayed at a different position from the position where the fields 211 to 213 are displayed during the above pasting, pasting is performed easily and efficiently as described above.

However, when a user wants to paste the information "history 2" in the field 214 of the input form D which is behind the clipboard window 150 indicated by the dotted line, the user has to perform the operation for shifting the display position of the clipboard window 150 to make the field 214 visible.

To solve this, the display position of the clipboard window 150 is moved without operation by the user. Specifically, first, the user drags the information "history 2" from the clipboard window 150, when the clipboard window 150 is displayed at the position of the dotted line.

While dragging the information "history 2", the user moves the finger out of the clipboard window 150. In other words, the user touches a part of the input destination application window 210 while dragging the information selected from the clipboard window 150, for expressing the intention for pasting the information "history 2" selected from the clipboard window 150 at a predetermined position in the input destination application window 210.

Further, since the paste destination is behind the clipboard window 150, in other words, in the clipboard window 150 with respect to coordinates, the user moves the touched item into the clipboard window 150 while dragging it.

When such operation is performed, it is determined that the position at which the user wants to paste the information is hidden by the clipboard window 150, and the display position of the clipboard window 150 is moved. Here, as a result of the move, the clipboard window 150' is moved to the right side of the drawing that does not hide the field 214 as illustrated in FIG. 10. Here, a prime is added to the clipboard window 150 after the move to distinguish it from the clipboard window 150 before the move.

Figure 11:
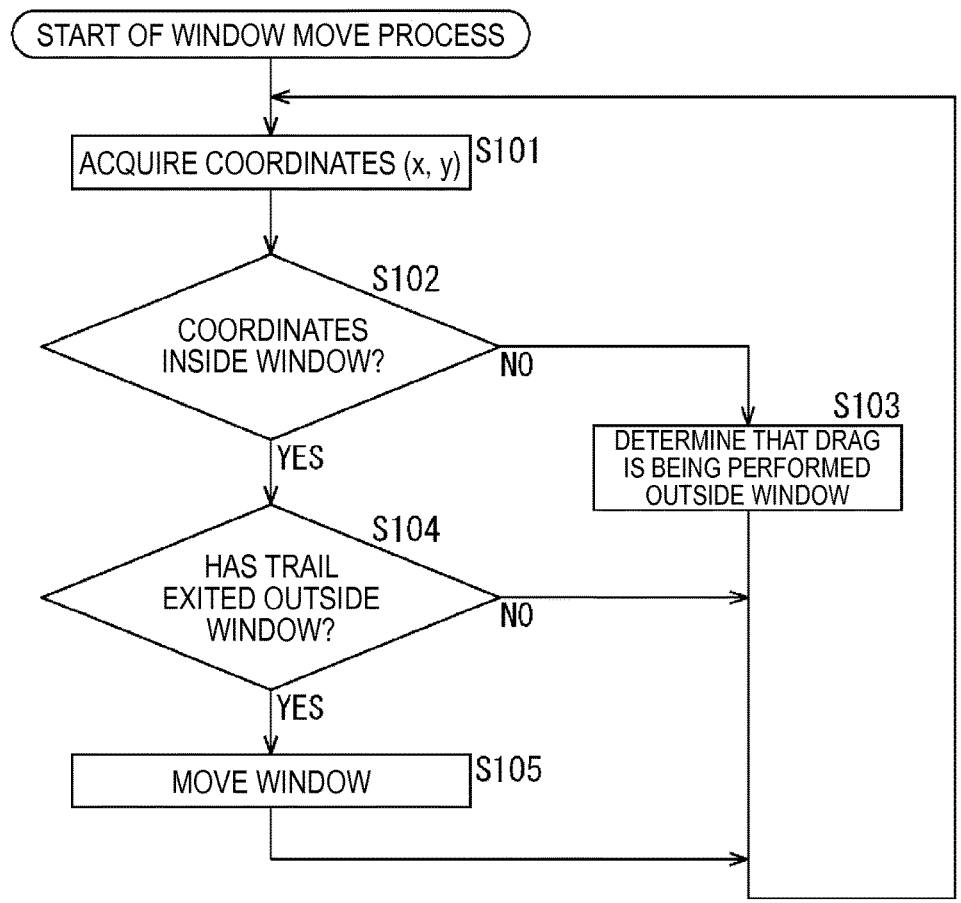
FIG. 11 is a flowchart for describing a process relevant to move of a clipboard window.

This process will be described with reference to the flowchart of FIG. 11. The process of the flowchart illustrated in FIG. 11 is started from the time point when drag is started by a user, and is executed while the drag is continuing. In step S101, the coordinates (x, y) on the screen image touched by a finger of the user are acquired.

In step S102, whether or not the acquired coordinates are coordinates inside the clipboard window 150 is determined. In step S102, if it is determined that the acquired coordinates are not the coordinates inside the clipboard window 150, the process proceeds to step S103.

In step S103, it is determined that drag is being performed in the region outside the clipboard window 150. While dragging, the process repeatedly returns to the process of step S101 and repeats the process in or after step S101.

On the other hand, in step S102, if it is determined that the acquired coordinates are the coordinates inside the clipboard window 150 the process proceeds to step S104. In step S104, whether or not the trail of the drag has exited outside the clipboard window 150 is determined. This determination is made by determining whether or not the process of step S103 is executed, in other words, by determining whether or not it has been determined that the acquired coordinates are not the coordinates inside the clipboard window 150 in step S102.

To make such determination, the history of coordinates is temporarily stored since the drag is started. In step S104, if it is determined that the trail of the drag has not exited outside the clipboard window 150, the process returns to step S101 and repeats the process in or after step S101.

On the other hand, in step S104, if it is determined that the trail of the drag has exited outside the clipboard window 150, the process proceeds to step S105. In this case, it is determined that the drag is inside the clipboard window 150 at the current time point, but the trail of the drag has exited outside the clipboard window 150. That is, it is determined that the operation described with reference to FIG. 10 is performed by the user.

Thus, in step S104, if it is determined that the trail of the drag has exited outside the clipboard window 150, the process proceeds to step S105, in order to move the clipboard window 150. This move will be described with reference to FIG. 12.

Figure 12:
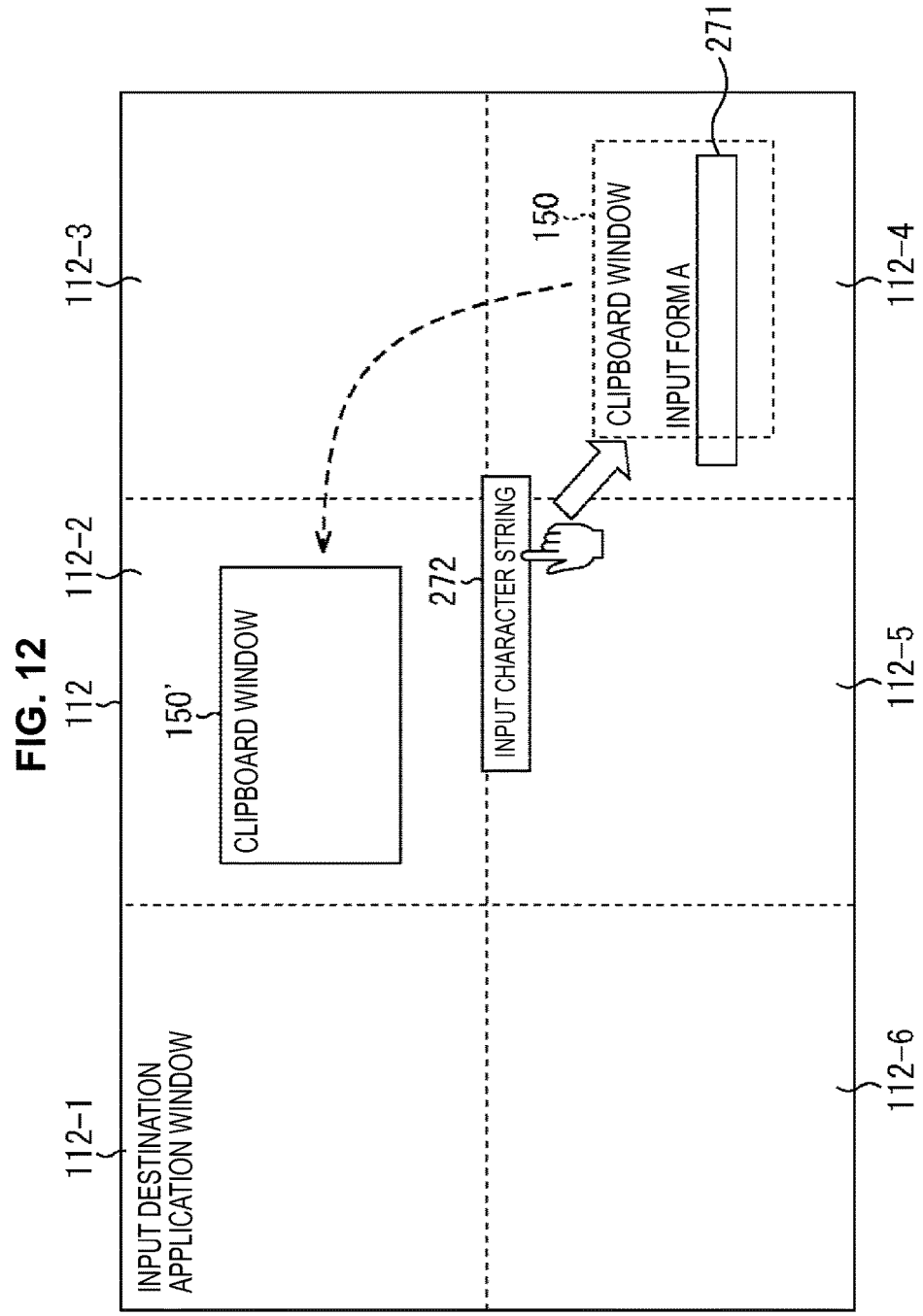
FIG. 12 is a diagram for describing move of a clipboard window.

As illustrated in FIG. 12, the screen image of the display 112 is divided into six sections. Although six sections are described, the screen image may be divided into other number of sections. Here, equally divided regions are referred to as regions 112-1 to 112-6, respectively.

In an example illustrated in FIG. 12, the region 112-4 includes the clipboard window 150 (depicted by a dotted line), and the field 271 of the input form A is behind the clipboard window 150. That is, in this case, the clipboard window 150 and the field 271 are in the region 112-4.

When the user selects the input character string 272 that the user wants to paste in the field 271 from the clipboard window 150, and drags it out of the clipboard window 150, and again brings it back into the clipboard window 150, the process described with reference to FIG. 11 is executed to move the clipboard window 150.

The move destination is another region. That is, in this case, the move destination is one of the regions 112-1 to 112-3, 112-5, and 112-6. Since the move destination of the clipboard window 150 is satisfactory if it is the region without the field 271, the clipboard window 150 is moved to the region 112-4 above the region 112-3 where the field 271 is positioned, for example.

As described above, the clipboard window 150 is moved to a region where the field 271 of the paste destination is positioned, which is a region adjacent in the vertical direction, or a region adjacent in the lateral direction. Also, the clipboard window 150 may be moved to a distant region, rather than the adjacent region. On the basis of some sort of condition, the clipboard window 150 is moved to a region other than the region where the field 271 of the paste destination is positioned.

An example of the condition is illustrated in FIG. 12. As the condition, the clipboard window 150 is moved to a region positioned in the opposite direction to the travel direction of the drag. As above, the drag is started from the clipboard window 150, and makes a U-turn to draw a trail that returns to the region where the clipboard window 150 is positioned. In this case, the clipboard window 150 is moved in the opposite direction to the travel direction of the drag when the drag returns from the outside of the clipboard window 150 into the inside of the clipboard window 150.

As described above, the clipboard window 150 is moved on the basis of the travel direction of the drag, so that the clipboard window 150 is moved from the input target that is positioned in the travel direction.

As described above, the clipboard window 150 is moved in response to the position of the input target, so that overlap of the input target on the clipboard window 150 is prevented. Also, the user is needless to move the clipboard window 150, and thus the labor of the user is reduced to improve the usability.

Although the trigger for moving the clipboard window 150 is based on the trail of the drag by the user, the trigger for moving the clipboard window 150 may be other operation by the user. That is, the move of the clipboard window 150 is performed when it is determined that the information paste destination and the clipboard window 150 overlap each other, so as to remove the state where the information paste destination and the clipboard window 150 overlap each other as a result.

For example, the "TAB" key of the keyboard is sometimes operated for switching the input target (the field 271 or the like). Thus, it may be such that, when the "TAB" key is operated, and the switch of the input target is detected, the clipboard window 150 is moved according to the position of the input target after the switch.

<Display Position of Clipboard Window>

As above, the clipboard window 150 is displayed at the position that does not hide the region of the information paste destination selected from the clipboard window 150. Also, in the above description, the clipboard window 150 is displayed at the position avoiding the region of the paste destination, for example, when a predetermined operation, such as long tapping of the region of paste destination, is performed while the clipboard window 150 is not displayed.

Here, additional description will be made of the display position when the clipboard window 150 is displayed by a predetermined operation that is performed when the clipboard window 150 is not displayed. Also, additional description will be made of the display position of the move destination when the displayed clipboard window 150 is moved as described with reference to FIG. 11 and FIG. 12.

Figure 13:
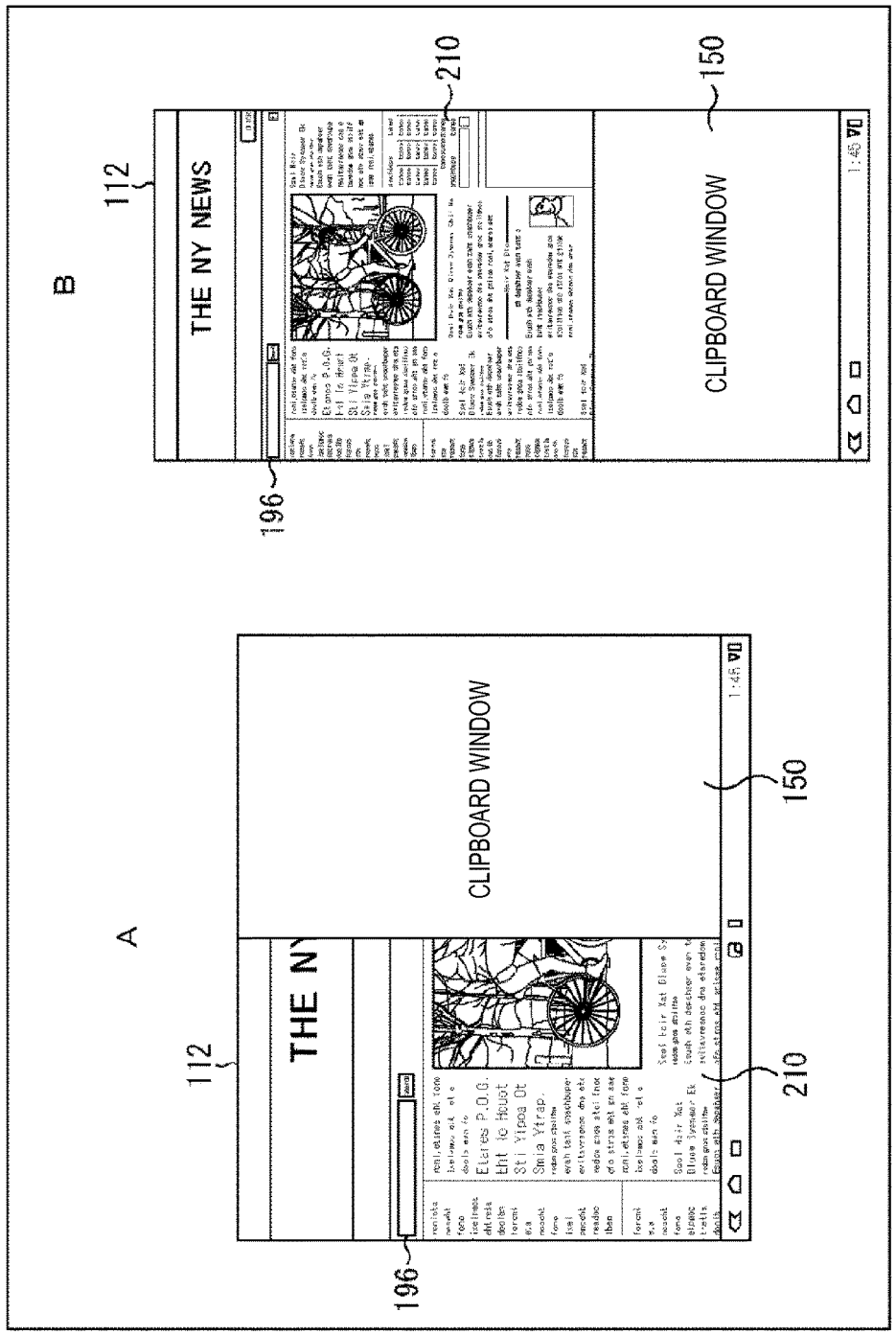
FIG. 13 is a diagram for describing display of a clipboard window.

FIG. 13 is a diagram illustrating an example of the display position of the clipboard window 150. The terminal 100 is configured to make an appropriate display for the direction, regardless of whether the vertical direction is the short side or the long side. Alternatively, the terminal 100 is used with the short side as the vertical direction, or with the long story as the vertical direction.

FIG. 13A is a diagram illustrating a state in which the terminal 100 is used with the short side as the vertical direction, and the input destination application window 210 is displayed on the display 112. Also, in the input destination application window 210, the character input field 196 is displayed on the upper left of the screen image. If a predetermined process, such as long tapping of the character input field 196, is performed while the input destination application window 210 is displayed, the clipboard window 150 is displayed on the right side of the screen image as illustrated in FIG. 13A.

As illustrated in FIG. 13A, the character input field 196 and the clipboard window 150 are displayed in such a manner that the character input field 196 and the clipboard window 150 do not overlap. In the screen image illustrated in FIG. 13A, since the character input field 196 is at the left side of the screen image, the clipboard window 150 is displayed on the right side of the screen image. The size of the clipboard window 150 in this case may be approximately half of the screen image as illustrated in FIG. 13A, or alternatively may be a size such as one fourth of the screen image.

Although not depicted, when the character input field 196 is at the right side of the screen image, the clipboard window 150 is displayed on the left side of the screen image. As described above, the clipboard window 150 is displayed in the region positioned at the opposite side in the lateral direction in relation to the region where characters are input (pasted).

FIG. 13B is a diagram illustrating a state in which the terminal 100 is used with the long side as the vertical direction, and the input destination application window 210 is displayed on the display 112. In the screen image illustrated in FIG. 13B, since the character input field 196 is at the upper side of the screen image, the clipboard window 150 is displayed at the lower side of the screen image. The size of the clipboard window 150 in this case may be approximately half of the screen image as illustrated in FIG. 13B, or alternatively may be a size such as one fourth of the screen image.

Although not depicted, when the character input field 196 is at the lower side of the screen image, the clipboard window 150 is displayed at the upper side of the screen image. As described above, the clipboard window 150 is displayed in the region positioned at the opposite side in the vertical direction in relation to the region where characters are input (pasted).

Figure 14:
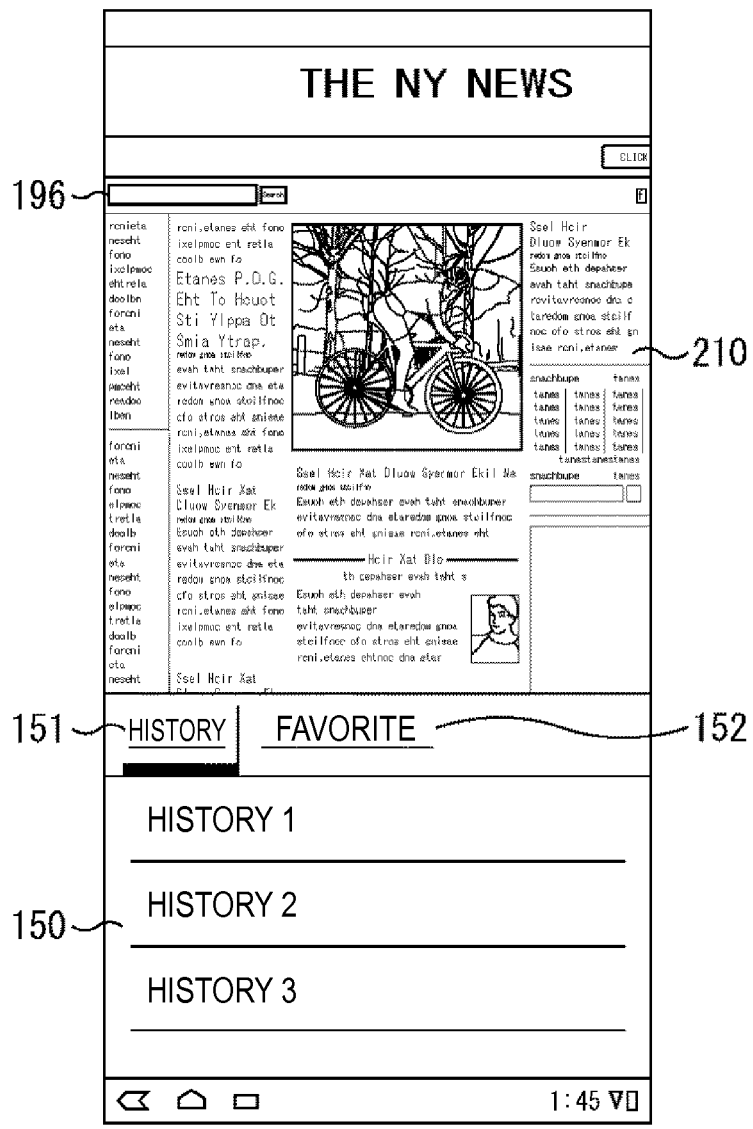
FIG. 14 is a diagram for describing display of a clipboard window.

For example, in FIG. 13B, when the clipboard window 150 is displayed behind the screen image, the display in the clipboard window 150 is the screen image illustrated in FIG. 14. In the clipboard window 150 in the screen image illustrated in FIG. 14, the "history" tab 151 and the "favorite" tab 152 are displayed.

As described above, when the lateral width of the clipboard window 150 is relatively short, the clipboard window 150 is displayed in the form of tabs, to allow the user to select a tab, in order to select intended information registered in one of history and favorite. Although not depicted, when a vertically long clipboard window 150 is displayed as in FIG. 13A, the clipboard window 150 may be displayed in the form of tabs as illustrated in FIG. 14, to display a state in which one of the tabs is opened.

Figure 15:
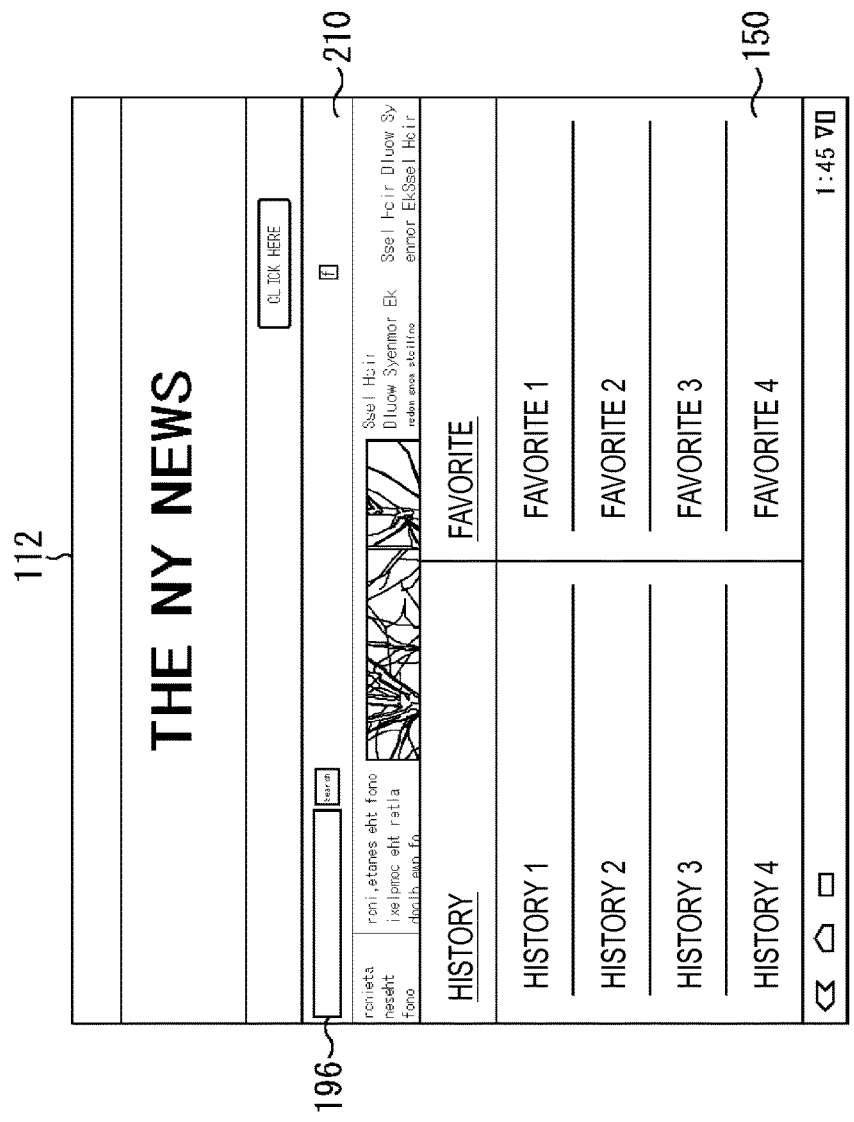
FIG. 15 is a diagram for describing display of a clipboard window.

On the other hand, when the lateral width of the clipboard window 150 is relatively long, the display may be such that the "history" and "favorite" tabs are both opened, and the character strings such as "history" and "favorite" are not displayed as tabs but as a piece of information as illustrated in FIG. 15, instead of the display in the form of tabs. With this display, the information registered in the history and the information registered in the favorite can be seen at once, and intended information is easily searched for.

The exemplary screen image illustrated in FIG. 15 is in a state in which the terminal 100 is used with its short side aligned in the vertical direction, and the input destination application window 210 is displayed on the display 112. In the exemplary screen image illustrated in FIG. 15, the character input field 196 is at the left side of the screen image, and the clipboard window 150 is displayed at the lower side of the screen image. Likewise FIG. 15, the exemplary screen image illustrated in FIG. 13A is also in a state in which the terminal 100 is used with its short side aligned in the vertical direction, and the input destination application window 210 is displayed on the display 112.

As described above, when the character input field 196 is at the upper left of the screen image, the clipboard window 150 may be displayed at the right side in consideration of the character input field 196 being at the left side, or the clipboard window 150 may be displayed at the lower side in consideration of the character input field 196 being at the upper side. In other words, the clipboard window 150 is controlled to be displayed at in the region positioned in the opposite direction to the region in which the character input field 196 is positioned, which is one of upward, downward, leftward, and rightward directions (including their oblique direction as well).

Figure 16:
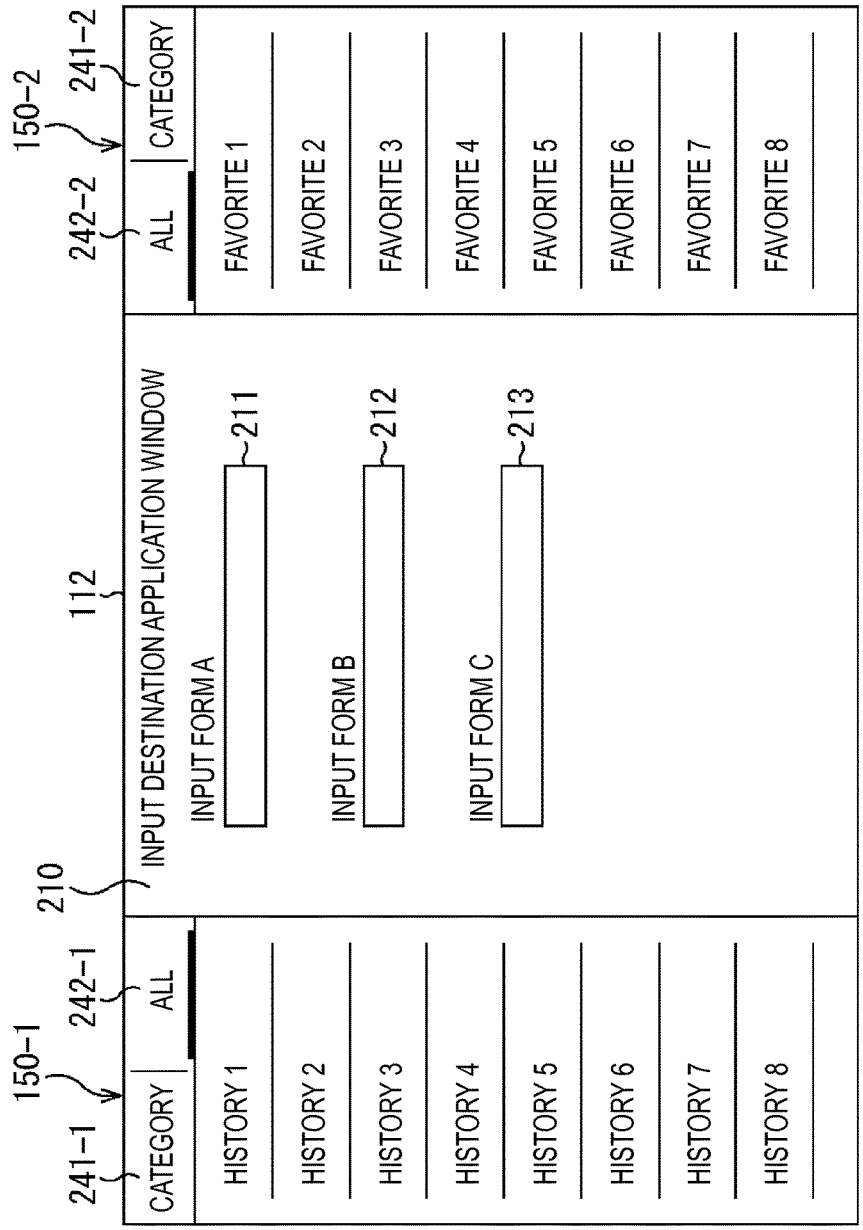
FIG. 16 is a diagram for describing display of a clipboard window.

Further, another display of the clip board window 150 will be described. FIG. 16 is a diagram illustrating another example of the display position of the clipboard window 150. As illustrated in FIG. 16, the clipboard window 150 may be displayed, divided into two windows.

In the left side of FIG. 16, a clipboard window 150-1 for displaying information registered in "history" is displayed. Also, in the clipboard window 150-1, a "category" tab 241-1 for displaying information in the state of being classified into each category, and an "all" tab 242-1 for displaying all registered information in temporal order or other order are displayed.

In the same way, in the right side of FIG. 16, a clipboard window 150-2 for displaying information registered in "favorite" is displayed. Also, in the clipboard window 150-2, a "category" tab 241-2 and an "all" tab 242-2 are displayed.

As described above, the clipboard window 150 may be displayed, divided into a plurality of sections. In an example illustrated in FIG. 16, the fields 211 to 213 are displayed at the center portion of the screen image as input targets. As described above, when the information selected from the clipboard window 150 is pasted in the region near the center of the screen image in the lateral direction, the clipboard window 150 may be displayed, divided into a left part and a right part.

As illustrated in FIG. 16, since the clipboard window 150 is displayed, divided into a left part and a right part, the information registered the in the history and the information registered in the favorite can be seen at once, and intended information is easily searched for.

Also, since the "category" tab 241 and the "all" tab 242 are provided, the user can search for intended information more easily, improving the usability, as described with reference to FIG. 8.

Figure 17:
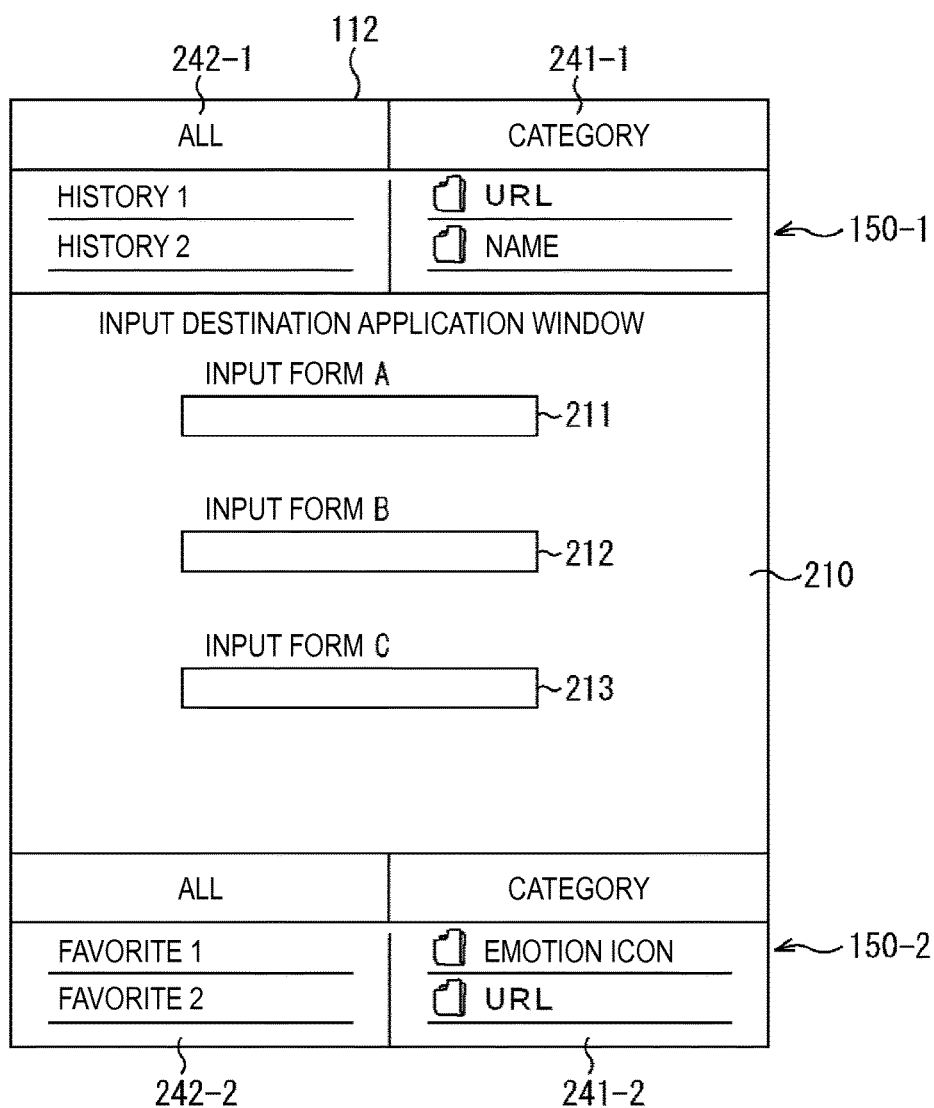
FIG. 17 is a diagram for describing display of a clipboard window.

When the clipboard window 150 is divided and displayed, the clipboard window 150 may be displayed, divided into a left part and a right part, as illustrated in FIG. 16, or may be displayed, divided into an upper part and a lower part as illustrated in FIG. 17.

Referring to FIG. 17, a clipboard window 150-1 is displayed at the upper side of the screen image, and a clipboard window 150-2 is displayed at the lower side of the screen image. Likewise, the exemplary screen image illustrated in FIG. 16, "category" tabs 241-1, 241-2 and "all" tabs 242-1, 242-2 are displayed in each of the clipboard window 150-1 and the clipboard window 150-2.

In an example illustrated in FIG. 17, the fields 211 to 213 are displayed at the center portion of the screen image as input targets. As described above, when the information selected from the clipboard window 150 is pasted in the region near the center of the screen image in the vertical direction, the clipboard window 150 may be displayed, divided into an upper part and a lower part.

When the clipboard window 150 is displayed, divided in the vertical direction as illustrated in FIG. 17 as well, the user can easily search for intended information with improved usability, in the same way as the clipboard window 150 displayed to be divided in the lateral direction as illustrated in FIG. 16.

Whether the clipboard window 150 is divided into a left part and a right part as illustrated in FIG. 16 or into an upper part and a lower part as illustrated in FIG. 17 may be decided, depending on different modes such as whether landscape mode or portrait mode for example, instead of the region for inputting information.

For example, in the landscape mode, the clipboard window 150 may be displayed, divided into a left part and a right part, as illustrated in FIG. 16. In the portrait mode, the clipboard window 150 may be displayed, divided into an upper part and a lower part, as illustrated in FIG. 17.

Although the clipboard window 150 is displayed, divided into two parts, for example, the clipboard window 150 may be displayed, divided into more than two parts. Also, when the clipboard window 150 is displayed in a divided manner, each of divided parts of the clipboard window 150 may be arranged and displayed in regions other than the region where information is pasted.

As described above, information is selected and pasted from the clipboard window 150 easily, by displaying the clipboard window 150 at a position that does not overlap the region for inputting information, or by displaying in a divided manner, depending on which part the region for inputting information is positioned at in the screen image.

<Recording Medium>

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 18:
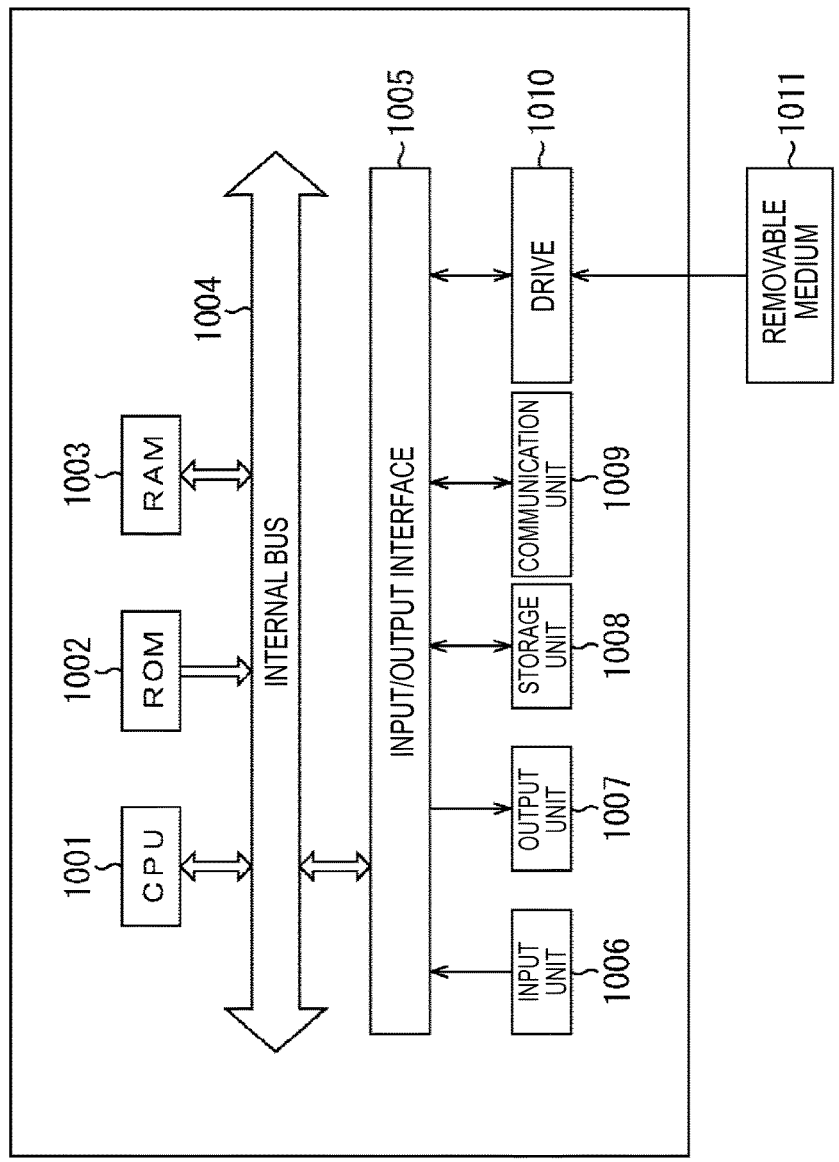
FIG. 18 is a diagram for describing a recording medium.

FIG. 18 is a block diagram showing an example configuration of the hardware of a computer that executes the series of processes described earlier according to a program. In the computer, a central processing unit (CPU) 1001, a read only memory (ROM) 1002 and a random access memory (RAM) 1003 are mutually connected by a bus 1004. An input/output interface 1005 is also connected to the bus 1004. An input unit 1006, an output unit 1007, a storage unit 1008, a communication unit 1009, and a drive 1010 are connected to the input/output interface 315.

The input unit 1006 is configured from a keyboard, a mouse, a microphone or the like. The output unit 1007 is configured from a display, a speaker or the like. The storage unit 1008 is configured from a hard disk, a non-volatile memory or the like. The communication unit 1009 is configured from a network interface or the like. The drive 1010 drives a removable medium 1011 such as a magnetic disk, an optical disk, a magneto-optical disk, a semiconductor memory or the like.

In the computer configured as described above, as one example the CPU 1001 loads a program stored in the storage unit 1008 via the input/output interface 1005 and the bus 1004 into the RAM 1003 and executes the program to carry out the series of processes described earlier.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer, by loading the removable medium 1011 into the drive 1010, the program can be installed into the storage unit 1008 via the input/output interface 1005. It is also possible to receive the program from a wired or wireless transfer medium using the communication unit 1009 and install the program into the storage unit 1008. As another alternative, the program can be installed in advance into the ROM 1002 or the storage unit 1008

It should be noted that the program executed by a computer may be a program that is processed in time series according to the sequence described in this specification or a program that is processed in parallel or at necessary timing such as upon calling.

In addition, the system in the specification includes a plurality of apparatuses, and represents the entirety thereof.

An embodiment of the disclosure is not limited to the embodiments described above, and various changes and modifications may be made without departing from the scope of the disclosure.

Additionally, the present technology may also be configured as below.

(1)

An information processing apparatus including:

an acquisition unit configured to acquire an input signal generated in response to user's input operation for specifying a predetermined position in an image displayed on a display unit; and a display control unit configured to allow display of a selection image for allowing a user to select display information that is newly displayed in a region according to the position, in a superimposed manner on the image, wherein the display control unit controls display of the display unit in such a manner that the region and the selection image do not overlap each other.

(2)

The information processing apparatus according to (1), wherein the display control unit controls the display in such a manner that the selection image is displayed at an opposite position to a position of the region in one of upward, downward, leftward, and rightward directions.

(3)

The information processing apparatus according to (1) or (2), wherein the display control unit divides the selection image into a plurality of sections, and locates the plurality of sections of the divided selection image in regions other than the region, respectively.

(4)

The information processing apparatus according to any one of (1) to (3), wherein the display control unit changes a display position of the selection image, when it is determined that the selection image and the region overlap each other.

(5)

The information processing apparatus according to any one of (1) to (4), wherein the display information displayed in the selection image is one of first information that accumulates, as a history, information for which a copy instruction is given, and second information selected from the accumulated information.

(6)

The information processing apparatus according to (5), wherein the selection image includes a tab that is operated for displaying the first information and a tab that is operated for displaying the second information, and includes display information corresponding to the tab selected.

(7)

The information processing apparatus according to (5), wherein the selection image includes both of the first information and the second information.

(8)

The information processing apparatus according to any one of (1) to (7), wherein the display information is displayed in a state of being classified into each category.

(9)

The information processing apparatus according to any one of (1) to (8), wherein the display information displayed in the selection image is sorted on the basis of information that is to be pasted in the region.

(10)

The information processing apparatus according to any one of (1) to (9), wherein
the selection image is displayed above an image including the region, regardless of whether or not the image including the region is in an active state.

(11)

The information processing apparatus according to any one of (1) to (10), further including:
an input operation accepting unit configured to accept input operation from the user; and
the display unit,
wherein the input operation accepting unit includes a touch panel.

(12)

The information processing apparatus according to (11), wherein
the selection image is displayed, when the region is pressed for a long period.

(13)

An information processing method including steps of:
acquiring an input signal generated in response to user's input operation for specifying a predetermined position in an image displayed on a display unit;
displaying a selection image for allowing a user to select display information that is newly displayed in a region according to the position, in a superimposed manner on the image; and
controlling display of the display unit in such a manner that the region and the selection image do not overlap each other.

(14)

A computer-readable recording medium having a program recorded thereon, the program causing a computer to execute a process including steps of:
acquiring an input signal generated in response to user's input operation for specifying a predetermined position in an image displayed on a display unit;
displaying a selection image for allowing a user to select display information that is newly displayed in a region according to the position, in a superimposed manner on the image; and
controlling display of the display unit in such a manner that the region and the selection image do not overlap each other.

REFERENCE SIGNS LIST 100 terminal
112 display
121 touch panel
150 clipboard window
151, 152 tab

The invention claimed is:

1. An information processing apparatus, comprising:
a display screen configured to display an image; and
at least one processor configured to:
acquire an input signal generated based on a user input operation on an input field in the displayed image;
specify, based on the acquired input signal, a first position in the displayed image,
wherein the specified first position corresponds to the input field in the displayed image;
control, based on the user input operation, the display screen to superimpose a selection image at a second position on the displayed image,
wherein the superimposed selection image comprises a plurality of data elements that are classified into a plurality of categories, and
wherein at least one data element of the plurality of data elements is an input for the input field, and
wherein display of the input field is occluded by the superimposed selection image;
detect a drag operation corresponding to the at least one data element of the plurality of data elements,
wherein the drag operation includes a first movement of the at least one data element of the plurality of data elements and a second movement of the at least one data element of the plurality of data elements,
wherein the second movement is subsequent to the first movement, and
wherein the first movement and the second movement are in opposite directions; and
control, based on the detected drag operation, the display screen to update position of the superimposed selection image from the second position to a third position on the displayed image, such that the superimposed selection image displayed at the third position and the input field are non-overlapping.

2. The information processing apparatus according to claim 1,
wherein the at least one processor is further configured to control, based on the first position of the input field, the display screen to superimpose the selection image at a region, of the display screen, in one of an upward direction, a downward direction, a leftward direction, or a rightward direction.

3. The information processing apparatus according to claim 1, wherein the plurality of data elements comprise one of a plurality of first data elements that accumulates as history information, or a plurality of second data elements selected from the plurality of first data elements.

4. The information processing apparatus according to claim 3,
wherein the superimposed selection image further includes a first tab that corresponds to the plurality of first data elements and a second tab that corresponds to the plurality of second data elements, and
wherein the at least one processor is further configured to control the display screen to display the plurality of data elements corresponding to one of the first tab or the second tab.

5. The information processing apparatus according to claim 3, wherein the superimposed selection image comprises both of the plurality of first data elements and the plurality of second data elements.

6. The information processing apparatus according to claim 1, wherein the at least one processor is further configured to sort the plurality of data elements based on a time of registration of each of the plurality of data elements.

7. The information processing apparatus according to claim 1, wherein the at least one processor is further configured to sort the plurality of data elements based on a type of the input field.

8. The information processing apparatus according to claim 1, wherein the selection image is superimposed on the displayed image that includes the input field irrespective of the input field that is in an active state.

9. The information processing apparatus according to claim 1, further comprising a touch panel included in the display screen.

10. The information processing apparatus according to claim 1, wherein the user input operation is a touch operation for a time period.

11. An information processing method, comprising:
in an information processing apparatus:
acquiring an input signal generated based on a user input operation on an input field in an image displayed on a display screen of the information processing apparatus;
specifying, based on the acquired input signal, a first position in the displayed image,
wherein the specified first position corresponds to the input field in the displayed image;
controlling, based on the user input operation, the display screen to superimpose a selection image at a second position on the displayed image,
wherein the superimposed selection image comprises a plurality of data elements that are classified into a plurality of categories, and
wherein at least one data element of the plurality of data elements is an input for the input field;
wherein display of the input field is occluded by the superimposed selection image;
detecting a drag operation corresponding to the at least one data element of the plurality of data elements,
wherein the drag operation includes a first movement of the at least one data element of the plurality of data elements and a second movement of the at least one data element of the plurality of data elements,
wherein the second movement is subsequent to the first movement, and
wherein the first movement and the second movement are in opposite directions; and
controlling, based on the detected drag operation, the display screen to update position of the superimposed selection image from the second position to a third position on the displayed image, such that the superimposed selection image displayed at the third position and the input field are non-overlapping.

12. A non-transitory computer-readable medium having recorded thereon, computer executable instructions which, when executed by a computer, cause the computer to execute operations, the operations comprising:
acquiring an input signal generated based on a user input operation on an input field in an image that is displayed on a display screen;
specifying, based on the acquired input signal, a first position in the displayed image,
wherein the specified first position corresponds to the input field in the displayed image;
controlling, based on the user input operation, the display screen to superimpose a selection image at a second position on the displayed image,
wherein the superimposed selection image comprises a plurality of data elements that are classified into a plurality of categories, and
wherein at least one data element of the plurality of data elements is an input for the input field;
wherein display of the input field is occluded by the superimposed selection image;
detecting a drag operation corresponding to the at least one data element of the plurality of data elements,
wherein the drag operation includes a first movement of the at least one data element of the plurality of data elements and a second movement of the at least one data element of the plurality of data elements,
wherein the second movement is subsequent to the first movement, and
wherein the first movement and the second movement are in opposite directions; and
controlling, based on the detected drag operation, the display screen to update position of the superimposed selection image from the second position to a third position on the displayed image, such that the superimposed selection image displayed at the third position and the input field are non-overlapping.

* * * * *